(12) United States Patent
Henker et al.

(10) Patent No.: US 11,748,074 B2
(45) Date of Patent: *Sep. 5, 2023

(54) USER EXIT DAEMON FOR USE WITH SPECIAL-PURPOSE PROCESSOR, MAINFRAME INCLUDING USER EXIT DAEMON, AND ASSOCIATED METHODS

(71) Applicant: SOFTWARE AG, Darmstadt (DE)

(72) Inventors: Uwe Henker, Reinheim (DE); Arno Zude, Darmstadt (DE); Dieter Kessler, Darmstadt (DE)

(73) Assignee: SOFTWARE AG, Darmstadt (DE)

( * ) Notice: Subject to any disclaimer, the term of this patent is extended or adjusted under 35 U.S.C. 154(b) by 229 days.

This patent is subject to a terminal disclaimer.

(21) Appl. No.: 17/334,117

(22) Filed: May 28, 2021

(65) Prior Publication Data
US 2022/0382528 A1 Dec. 1, 2022

(51) Int. Cl.
*G06F 8/65* (2018.01)
*G06F 8/41* (2018.01)
(Continued)

(52) U.S. Cl.
CPC ............ *G06F 8/447* (2013.01); *G06F 8/65* (2013.01); *G06F 9/449* (2018.02); *G06F 16/285* (2019.01)

(58) Field of Classification Search
CPC .......... G06F 8/447; G06F 8/865; G06F 9/449
See application file for complete search history.

(56) References Cited

U.S. PATENT DOCUMENTS

| 5,230,049 A | 7/1993 | Chang et al. |
| 5,553,286 A | 9/1996 | Lee |

(Continued)

FOREIGN PATENT DOCUMENTS

| EP | 0348563 | 1/1990 |
| EP | 0740250 | 10/1996 |
| EP | 2610739 | 7/2013 |

OTHER PUBLICATIONS

Agner Fog, Instructions for objconv. Version 2.10 ("cof2elf.cpp"), Jul. 24, 2011, pp. 1-35 XP002675842 [retrieved May 9, 2012] URL:http://web.archive.org/web/20110724225859/http://www.agner.org/optimize/objconv.zip.

(Continued)

*Primary Examiner* — Duy Khuong T Nguyen
(74) *Attorney, Agent, or Firm* — Nixon & Vanderhye PC

(57) ABSTRACT

Certain example embodiments relate to techniques for use with mainframe computing systems that include both general-purpose processors (e.g., CPs) and special-purpose processors that can be used to perform only certain limited operations (e.g., zIIPs). Certain example embodiments automatically help these special-purpose processors perform user exits and other routines thereon, rather than requiring those operations to be performed on general-purpose processors. This approach advantageously can improve system performance when executing programs including these user exits and other routines, and in a preferred embodiment, it can be accomplished in connection with a suitably-configured user exit daemon. In a preferred embodiment, the daemon and its clients can use a user exit property table or the like to communicate with one another about the state of each user exit or other routine that has been analyzed, classified, and possibly modified.

30 Claims, 12 Drawing Sheets

User Exit or Other Program

```
Pick up input parameters
On first call, GETMAIN work storage       } Not zIIP-eligible ... (program logic) ...                    } Can this run on a zIIP?

If (condition) THEN PUT record
On last call, FREEMAIN work storage       } Not zIIP-eligible
Return to caller
```

(51) Int. Cl.
*G06F 16/28* (2019.01)
*G06F 9/448* (2018.01)

(56) References Cited

U.S. PATENT DOCUMENTS

| | | | |
|---|---|---|---|
| 5,640,550 | A | 6/1997 | Coker |
| 5,875,331 | A | 2/1999 | Lindsey |
| 6,061,519 | A | 5/2000 | Rathnam |
| 6,182,277 | B1 | 1/2001 | DeGroot et al. |
| 6,484,309 | B2 | 11/2002 | Nowlin et al. |
| 7,254,807 | B2 | 8/2007 | Sakata et al. |
| 8,352,947 | B2 | 1/2013 | Laviolette |
| 8,910,130 | B2 | 12/2014 | Münster et al. |
| 8,935,516 | B2 | 1/2015 | Driscoll et al. |
| 11,334,324 | B2 | 5/2022 | Henker |
| 2001/0011371 | A1 | 8/2001 | Tang |
| 2002/0199174 | A1 | 12/2002 | Tapperson |
| 2004/0015834 | A1 | 1/2004 | Mestre et al. |
| 2006/0031820 | A1 | 2/2006 | Li |
| 2008/0059769 | A1 | 3/2008 | Rymarczyk et al. |
| 2008/0307392 | A1 | 12/2008 | Racca et al. |
| 2010/0115221 | A1 | 5/2010 | Klein |
| 2011/0035205 | A1 | 2/2011 | Brideson et al. |
| 2012/0110652 | A1 | 5/2012 | Brown et al. |
| 2012/0144157 | A1* | 6/2012 | Crew ............ G06F 9/5066 712/30 |
| 2013/0174130 | A1 | 7/2013 | Muenster et al. |
| 2014/0096147 | A1 | 4/2014 | Aarts et al. |
| 2014/0244983 | A1 | 8/2014 | Mcdonald et al. |
| 2017/0286177 | A1 | 10/2017 | Bishop et al. |
| 2019/0042288 | A1 | 2/2019 | Hanumantharau et al. |
| 2021/0141613 | A1 | 5/2021 | Henker |

OTHER PUBLICATIONS

Agner Fog, "elf2cof.cpp", Jul. 24, 2011, pp. 1-10, XP002677278 [retrieved May 9, 2012] URL:http ://web.archive.org/web/20110724225859/http://www.agner.org/optimize/objconv. zip.

Agner Fog, "cof2omf.cpp", Jul. 24, 2011, pp. 1-8, XP002677279 [retrieved May 9, 2012] URL:http://web.archive.org/web/20 11 0724225859/http://www.agner.org/optimize/objconv.zip.

Agner Fog, "omf2coff.cpp", Jul. 24, 2011, pp. 1-10, XP002677280 [retrieved May 9, 2012] URL:http://web.archive.org/web/20110724225859/http://www.agner.org/optimize/objconv. zip.

Agner Fog, "omf2cof", Jul. 24, 2011, pp. 1-11, XP002677281 [retrieved Jul. 24, 2011] URL:http://web.archive.org/web/20110724225859/http://www.agner.org/optimize/objconv. zip.

* cited by examiner

Original Object Code

GETMAIN RU,LV=(0),LOC=24
hhhh hhhh hhhh hhhh hhhh
hhhh hhhh hhhh hhhh hhhh
hhhh 45l0 xyyy 0a0a hhhh
hhhh (...)

Patched Object Code

STORAGE OBTAIN,LENGTH=(0),LOC=24
hhhh hhhh hhhh hhhh hhhh
hhhh hhhh hhhh hhhh hhhh
hhhh C0F4 zzzz zzzz hhhh
hhhh (...)
41F0 0012 58E0 0010 58EE 0304 58EE 00A0
B218 E000 C0F4 wwww wwww Branch to patch area
Return from patch area

Fig. 6

| UE Name | Version ID | UED eligible | Start on zIIP | Added Params | 1 Add. Param | 2 Add. Param | 3 Add. Param | ... |
|---|---|---|---|---|---|---|---|---|
| UEX01 | X'0144DE3F...' | true | true | false | | | | |
| LUEXIT1X (CICS) | X'98F7B398...' | true | true | true | "SYSID" | "NETNAME" | "TRAN-ID" | |
| TSTLNK1M (Batch) | X'00359EF2...' | true | true | true | "Program Name" | "USER-ID" | "Task Number" | |
| UEX5A | X'FF0802AA...' | true | true | true | "PROC ID" | "ASID" | "Job Name" | |
| TRMLNKX1 | X'000005B2...' | true | false | false | | | | |
| COBUXT04 | X'C0B01004...' | false | false | false | | | | |
| ... | | | | | | | | |

Fig. 13

User Exit original Parameter List

| 1 | <Function ID> |
| 2 | <time> |
| 3 | <Call ID> |
| 4 | <Adabas CB> |

User Exit modified Parameter List

| 1 | <Function ID> |
| 2 | <time> |
| 3 | <Call ID> |
| 4 | <Adabas CB> |
| 5 | <Proc ID> |
| 6 | <ASID> |
| 7 | <Job Name> |

USER EXIT DAEMON FOR USE WITH SPECIAL-PURPOSE PROCESSOR, MAINFRAME INCLUDING USER EXIT DAEMON, AND ASSOCIATED METHODS

TECHNICAL FIELD

Certain example embodiments described herein relate to techniques for use with mainframe computing systems that include both general-purpose processors and special-purpose processors that can be used to perform only certain limited operations. More particularly, certain example embodiments described herein relate to techniques that automatically help special-purpose processors perform user exits and other routines thereon rather than requiring those operations to be performed on general-purpose processors.

BACKGROUND AND SUMMARY

An IBM System z Integrated Information Processor (zIIP) is a special-purpose processor provided on an IBM System Z host. It was developed to handle specific computer processing situations, where a better-than-average performance is desired and/or required. IBM introduced these special-purpose zIIP processors for their Z9 (and successor) mainframe systems in 2006, adding a lower cost and advanced performance processor to "help out" the general mainframe central processor (CP) in specific and restricted situations. For example, zIIPs are designed to operate asynchronously with the more general purpose central processor to help improve utilization of computing capacity in a mainframe, e.g., in connection with select data and transaction processing workloads, for select network encryption workloads, etc. Thus, zIIPs can speed up processing and reduce costs for IBM's mainframe hardware and software. Because zIIPs are purpose-built, their usage is restricted to only certain types of code. In brief, although it is possible to quickly execute some code via zIIPs, in conventional arrangements, other code must be executed via the central processor.

zIIPs are specific to mainframe computers running IBM's z/OS operating system, which currently is a 64-bit operating system for IBM mainframes. They do not exist and are not usable on other hardware architectures or operating systems. zIIPs meanwhile also can be used by Independent Software Vendors (ISVs), who build their applications specially for the IBM mainframe architecture. It is therefore advantageous for ISVs to make the best use of the capabilities of the zIIPs with respect to performance as well as cost.

That said, as noted above, there are some limitations to the use of zIIPs. For example, although zIIPs support many operations, the programs they execute must not invoke any of several standard operating system services, such as input/output operations (I/O). Even though these operating system services are standard and might be commonly used in a wide variety of different programs, if they are invoked, the system will terminate the program abnormally (with an error).

As another example of the limitations of using zIIPs, non-Java program code cannot be run thereon. z/OS program load modules contain compiled program language code in machine code for the Cobol, PL1, Fortran, and C/C++ languages. These are examples of non-Java program code. However, non-Java program code cannot be run on a zIIP because the program language for neither the compiler nor for the Language Environment (LE) Runtime supports it. Currently, only Java programs including Node.js can be run on zIIP. This is a restriction imposed by IBM in connection with its zIIPs. In the IBM zIIP context, these restrictions imply what code and calls are deemed privileged and what can/cannot be executed.

2

One typical way to utilize zIIPs is to generally run a program on a zIIP, switch to a CP for each operation that is not supported by the zIIP, and switch back to a zIIP after that operation has been executed. This approach is shown in FIGS. 1a-1b. That is, FIG. 1a is a program view of what happens when a program switches from zIIP processing to CP processing and back in accordance with certain conventional techniques, and FIG. 1b is a processor view of the same. As shown in FIG. 1b, zIIP-eligible code in a first block 102a runs on the zIIP until there is a first call 104a to switch from zIIP processing to CP processing so that zIIP-ineligible code in a second block 102b can run. When the zIIP-ineligible code in the second block 102b is complete, a second call 104b is made to switch back to zIIP processing so that further zIIP-eligible code in a third block 102c can run on the zIIP. From the processor view in FIG. 1b, a first unit of work is dispatched, causing the zIIP-eligible code in the first block 102a to run. That first unit of work is suspended when the zIIP-ineligible code in the second block 102b is encountered, and a second unit of work is dispatched so that the zIIP-ineligible code in the second block 102b can run. When complete, the zIIP-ineligible code in the second block 102b is suspended, and a third unit of work is dispatched so that the zIIP-eligible code in the third block 102c can run, etc.

This type of switching can be used to ensure program execution even when zIIP-ineligible code is included therein. Unfortunately, however, switching the execution of a program from one processor to another incurs processing "costs." For example, suspending the program on one processor and resuming it on another requires extra CPU time not spent productively on the program execution; the new processor may be already at work at the time and may resume the execution of the program only after some delay; the processor caches will usually induce extra memory access delays because they contain less of the program's working storage close to the new processor; etc. These are all examples of processing costs that may be incurred.

Constantly switching the execution to a CP when necessary and back to a zIIP when possible therefore is not necessarily the most efficient way to utilize zIIP processors. This is especially true if parts of the program are not known upfront and might possibly perform some operation that is not eligible for execution on a zIIP. Such code parts typically must then be executed entirely on a CP, e.g., to help avoid a situation where a program is terminated for attempting to perform a zIIP-ineligible operation. This may be the case, for example, for code provided by users of the program (called "user exits") or for code invoked by the program that does not originate from the same source and has not specifically been prepared for running on a zIIP.

The techniques of certain example embodiments help address the above-described and/or other concerns. For example, certain example embodiments help maximize the execution of instructions on zIIPs, minimize the execution of instructions on CPs, and reduce the CPU overhead for switching between zIIPs and CPs in programs that include user exits or other code that has not specifically been prepared for running on a zIIP.

Certain example embodiments help enable the use of zIIPs, in an automated fashion, in connection with a larger range of existing applications. For instance, using the techniques of certain example embodiments, it becomes possible to more efficiently perform program code on zIIPs even if the program includes user exits, code invoked by the program that does not originate from the same source and has not specifically been prepared for running on a zIIP, etc.

In certain example embodiments, a requester can call a user exit or other routine on a zIIP directly if the routine is entirely zIIP-eligible, or if each zIIP-ineligible operation is preceded by a switch to a CP. In either case, zIIP-ineligible operations may have been replaced by functionally-equivalent zIIP-eligible ones, e.g., by patching. Thus, in certain example embodiments, when a user exit is marked zIIP-eligible, the user exit or other routine can be started under zIIP processing (possibly after patching). In certain example embodiments, it does not matter whether the code was modified to switch at a later time back to CP or not, because the necessary instructions for switching are all placed into the user exit by code modification operations.

In certain example embodiments, the system simply needs to know whether processing can start with the zIIP, which is determined to be the case if at least some part of the code can be executed via the zIIP. In such cases, processing is started using the zIIP, even if the first instruction is not zIIP-eligible.

In certain example embodiments, there is provided a computing system comprising a special-purpose processor, and a general-purpose processor controllable to execute at least some calls that cannot be executed on the special purpose processor. The computing system is controllable to execute a program thereon. The program comprises a user exit implemented in user exit object code and that is callable by a requester running on the special-purpose processor. The computing system is controllable to perform operations comprising: automatically classifying the user exit object code as belonging to one of a plurality of possible categories comprising: (a) entirely eligible for execution via the special-purpose processor, (b) eligible for execution via the special-purpose processor provided that each user exit object code portion that is ineligible for execution via the special-purpose processor is replaced with an equivalent special-purpose processor eligible substitute call, (c) patchable to cause a switch from special-purpose processor processing to general purpose-processor processing for each user exit object code portion that inherently cannot be executed via the special-purpose processor, and (d) unclassifiable into one of (a) through (c); in response to the user exit object code being classified into category (b), attempting to modify the user exit object code to replace each user exit object code portion that is ineligible for execution via the special-purpose processor with an equivalent special-purpose processor eligible substitute call; and in response to the user exit object code being classified into category (c), attempting to modify the user exit object code to patch the user exit object code to cause system processing to switch from special-purpose processor processing to general-purpose processor processing for each user exit object code portion that inherently cannot be executed via the special-purpose processor. The requester running on the special-purpose processor is configured to at least call the user exit in response to the user exit being classified into one of categories (a) and (b).

According to certain example embodiments, a list of locations in the user exit object code where instruction sequences thereof are not eligible for execution via the special-purpose processor can be generated.

According to certain example embodiments, the user exit object code can be reclassified following attempted modification.

According to certain example embodiments, modification attempts may be performed dynamically at runtime.

According to certain example embodiments, the system may include a daemon configured to facilitate execution of the program. The requester running on the special-purpose processor may be configured to at least: call the user exit in response to the user exit being classified into category (a) or (b), and otherwise invoke a daemon service running on the daemon as if a special-purpose processor ineligible call had been reached immediately upon the call of the user exit; and invoke a daemon service running on the daemon upon reaching a special-purpose processor ineligible call during execution of the user exit. The daemon service may be configured to at least: resume execution of the user exit on the general-purpose processor upon invocation of the daemon service; and following execution of the special-purpose processor ineligible call, determine whether to continue execution of the user exit on the general-purpose processor or to switch back to the special-purpose process for continued execution of the user exit thereon.

The daemon may in certain example embodiments be configured to perform the classification and to attempt the modifications, execute multiple user exits for different requesters concurrently on different processors, execute multiple user exits for different requesters, each running in its own address space, and/or the like.

According to certain example embodiments, in response to the user exit object code being classified into a category indicating that the user exit code is to be executed entirely on the general-purpose processor: a program call (PC) routine may be invoked in an address space of the daemon by the requester running on the special-purpose processor; the PC routine may be configured to place on a work queue for the general-purpose processor work requests associated with running the user exit, and to wait for results of the requests; for each request placed in the work queue, the general-purpose processor may be configured to retrieve and process the respective requests, invoking the user exit in the daemon address space by the general-purpose processor; and control may be returned to the requester running on the special-purpose processor for further execution of the program when performance of the user exit has completed.

According to certain example embodiments, a requester address space and a daemon address space may be provided. In response to the user exit object code being classified or reclassified into category (c) and the user exit object code being successfully patched: the requester, running in the requester address space, may be configured to call the user exit on the special-purpose processor; and if the user exit running in the requester address reaches a point where it is to perform a special-purpose processor ineligible operation: the user exit may be controlled to return control to the requester by virtue of a first call inserted into the user exit object code via the patching; the requester may be configured to save a current execution state of the user exit and set up a request to the daemon to resume execution of the user exit on the general-purpose processor; a PC routine may be invoked in the daemon address space; the PC routine in the daemon address space may be configured to place the request on a work queue for the general-purpose processor running in the daemon address space; the PC routine running in the daemon address space may be configured to give control back to the requester in the requester address space; the requester may be configured to suspend a unit of work corresponding to the request placed on the work queue; the general-purpose processor running in the daemon address space may be configured to retrieve the request from the work queue and invoke a PC routine in the requester address space; the PC routine in the requester address space may be configured to restore the current execution state of the user exit and resume execution of the user exit; after execution of special-purpose processor ineligible operation, the user exit may be configured to return control to the PC routine in the requester address space by virtue of a second call inserted into the user exit object code via the patching; and a determination may be made as to whether to switch back to processing via the special-purpose processor or to continue execution via the general-purpose processor.

According to certain example embodiments, and potentially in addition to the features of the previous paragraph, if the requester makes a determination to switch back to processing via the special-purpose processor: the current execution state of the user exit may be saved and a result is placed on the result queue for resumption of execution on the special-purpose processor; the PC routine in the requester address space may be configured to give control back to the general-purpose processor running in the daemon address space; and the requester may be configured to take the result from the result queue and restore the current execution state of the user exit, resuming execution of the user exit. The user exit may be configured to return control to the requester to continue execution of the program. Moreover, in certain example embodiments, when the special-purpose processor is running in the daemon address space, further requests placed on the work queue may be processible.

According to certain example embodiments, a memory may be configured to store a data structure tracking information about user exit routines. For example, the data structure may include a unique name of each user exit that has been analyzed and processed, e.g., with the data structure potentially including information specifying whether a caller of an associated user exit must provide additional parameters, and optionally with the additional parameters potentially including environmental information needed by the associated user exit and are specified in the data structure.

As will be appreciated from the description, the special-purpose processor may be an IBM System z Integrated Information Processor (zIIP).

The features summarized above and discussed in detail below may be used in connection with user exits or a variety of callable routines more generally. That is, the techniques of certain example embodiments may work with callable routines that constitute code provided by a user of the program, code invokable by the program that does not originate from the same source as the program, and/or the like.

In certain example embodiments, there is provided a method for executing a program on a computing system comprising a special-purpose processor and a general-purpose processor controllable to execute at least some calls that cannot be executed on the special purpose processor, with the program comprising a callable routine implemented in callable routine object code and being callable by a requester running on the special-purpose processor. The method comprises: automatically classifying the callable routine object code as belonging to one of a plurality of possible categories comprising: (a) entirely eligible for execution via the special-purpose processor, (b) eligible for execution via the special-purpose processor provided that each callable routine object code portion that is ineligible for execution via the special-purpose processor is replaced with an equivalent special-purpose processor eligible substitute call, (c) patchable to cause a switch from special-purpose processor processing to general purpose-processor processing for each callable routine object code portion that inherently cannot be executed via the special-purpose processor, and (d) unclassifiable into one of (a) through (c); in response to the callable routine object code being classified into category (b), attempting to modify the callable routine object code to replace each callable routine object code portion that is ineligible for execution via the special-purpose processor with an equivalent special-purpose processor eligible substitute call; and in response to the callable routine object code being classified into category (c), attempting to modify the callable routine object code to patch the callable routine object code to cause system processing to switch from special-purpose processor processing to general-purpose processor processing for each callable routine object code portion that inherently cannot be executed via the special-purpose processor. The requester running on the special-purpose processor is configured to at least call the callable routine in response to the callable routine being classified into one of categories (a) and (b).

In certain example embodiments, there is provided a non-transitory computer readable storage medium tangibly storing instructions that aid in executing a program on a computing system comprising a special-purpose processor and a general-purpose processor controllable to execute at least some calls that cannot be executed on the special purpose processor, the program comprising a callable routine implemented in callable routine object code and being callable by a requester running on the special-purpose processor. These instructions, when executed, perform operations comprising: automatically classifying the callable routine object code as belonging to one of a plurality of possible categories comprising: (a) entirely eligible for execution via the special-purpose processor, (b) eligible for execution via the special-purpose processor provided that each callable routine object code portion that is ineligible for execution via the special-purpose processor is replaced with an equivalent special-purpose processor eligible substitute call, (c) patchable to cause a switch from special-purpose processor processing to general purpose-processor processing for each callable routine object code portion that inherently cannot be executed via the special-purpose processor, and (d) unclassifiable into one of (a) through (c); in response to the callable routine object code being classified into category (b), attempting to modify the callable routine object code to replace each callable routine object code portion that is ineligible for execution via the special-purpose processor with an equivalent special-purpose processor eligible substitute call; and in response to the callable routine object code being classified into category (c), attempting to modify the callable routine object code to patch the callable routine object code to cause system processing to switch from special-purpose processor processing to general-purpose processor processing for each callable routine object code portion that inherently cannot be executed via the special-purpose processor. The requester running on the special-purpose processor is configured to at least call the callable routine in response to the callable routine being classified into one of categories (a) and (b).

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 6 shows object code before and after patching in connection with a GETMAIN example described herein;

FIG. 13 is an example User Exit Property Table;

FIG. 14 shows original and modified user exit parameter lists for the user exit UEXSA example, discussed in greater detail below;

DETAILED DESCRIPTION

Certain example embodiments relate to techniques for use with mainframe computing systems that include both general-purpose processors (e.g., CPs) and special-purpose processors that can be used to perform only certain limited operations (e.g., zIIPs). Certain example embodiments automatically help these special-purpose processors perform user exits and other routines thereon, rather than requiring those operations to be performed on general-purpose processors. This approach advantageously can improve system performance when executing programs including these user exits and other routines, and it can be accomplished in connection with a suitably-configured user exit daemon, e.g., as discussed in detail below.

In a typical scenario where independent software vendors offer products for IBM mainframe computers, a general purpose application (such as, for example, a database management system or an application development framework) needs to cooperate with and directly execute routines that are provided by customers ("user exits") or that originate from other sources and have not been specifically prepared for running on a zIIP.

Figures 2, 3, 4:
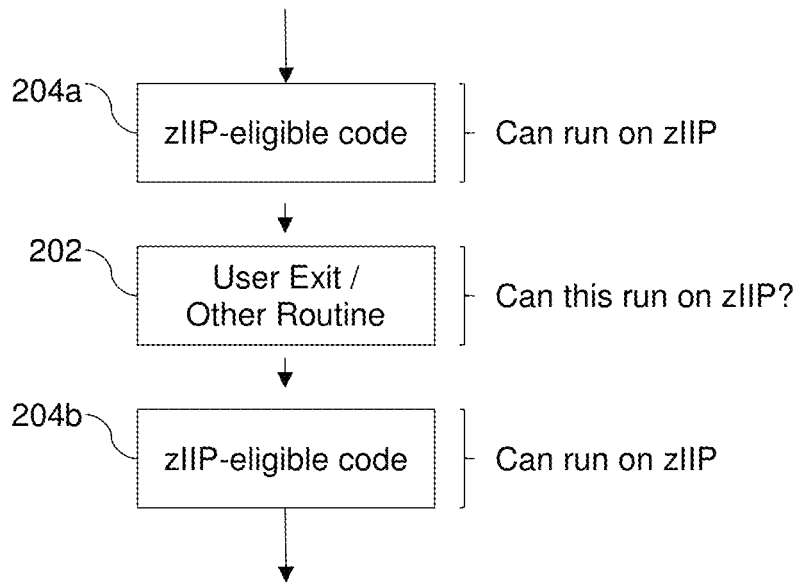
FIG. 2 shows a user exit or other routine sandwiched between zIIP-eligible code blocks.
FIG. 3 shows an example user exit or other program that calculates a new value from provided input parameters.
FIG. 4 shows an example user exit or other program that allocates and release work storage using GETMAIN and FREEMAIN calls.

In the example of a database, the code for the database management system itself may be optimized to run on the zIIP processor to the largest extent possible, where the absence of restricted operations can be guaranteed. However, if the database needs to execute a user exit provided by the customer, it may not "know" whether the user exit code is eligible for execution of a zIIP. This is the case in FIG. 2, which shows a user exit or other routine 202 sandwiched between zIIP-eligible code blocks 204a-204b. Program calls to this "unknown" user exit or other routine 202 may or may not be zIIP eligible. Therefore, a conventional approach will take a precautionary measure involving the database code switching from execution on a zIIP to a CP, executing the user exit routine via the CP, and then switching back to the zIIP, where execution is deemed to be safe with the database code. In a conventional approach, this switching to a CP takes place, even if the entire user exit or large parts of it could also run on a zIIP.

Certain example embodiments provide infrastructure and processing for execution of user exits and other routines on zIIPs where possible, even if they have not been specifically prepared for running on a zIIP. Notionally, the components included in certain example embodiments can be divided into four parts. This is a notional breakdown, so these four parts may in different example embodiments be implemented in the same or different program logic segments, different hardware, different software modules, etc. That is, functions may be provided for executing some or all of the following and/or components to enable the technology of certain example embodiments. The functions may be grouped or separated into discrete parts in different example implementations. Thus, although notional groupings and detailed implementations are provided below, it will be appreciated that these details are exemplary in nature and are not intended to be limiting on the invention unless expressly claimed.

The first component is an automatic analysis component. The automatic analysis component automatically analyzes the object code of a user exit or other routine to derive whether it may perform operations that cannot be performed on a zIIP.

The second component is an automatic classification component. The automatic classification component automatically classifies the object code of a user exit or other routine so as to determine which parts of the code can and should be executed on a zIIP.

The third component is an automatic modification or "patching" component. The automatic modification or patching component automatically modifies the object code of a user exit or other routine to: replace zIIP-ineligible operations with functionally equivalent zIIP-eligible operations, or switch execution to a CP for invariably zIIP-ineligible operations.

The fourth component is a "User Exit Daemon" (UED), which in certain example embodiments functions as a separate "server" for user exit execution. The UED helps combine functions to analyze, classify, and patch object code and to invoke and execute it appropriately on zIIPs and CPs, into a "central server" for any zIIP-enabled requesters that need to call user exits or other routines that may perform zIIP-ineligible operations. The UED thus may be implemented on or separate from the mainframe. However, it is able to access at least the object code being or planned for execution, and it is able to modify it so as to make zIIP-ineligible code eligible for operation on a zIIP. It thus may have access to memory locations of the mainframe and may be able to cause switches from processing on each processor type, e.g., as set forth in greater detail below.

Further details regarding these four notional components are provided below.

Example Techniques for Automatic Analysis of the Object Code Of A User Exit

To a large extent, the object code (i.e., code in a format understood and executed by the processors) of an unknown program (here, a user exit) can be analyzed automatically to derive some of its characteristics, such as whether it may perform operations that cannot be performed on a zIIP. Complete automatic analysis is well known to be theoretically impossible in the general case. That said, many programs used in practical environments are sufficiently "well behaved" to allow automatic detection of operations that affect the eligibility for execution on a zIIP. This is especially the case for programs compiled from the source code of higher-level programming languages (e.g., languages provided at a level higher than object code such as, for example, Cobol, C, C++, etc.).

The techniques set forth in co-owned and commonly assigned U.S. Publication No. 2021/0141613 may be used to automatically detect operations that affect the eligibility of code to properly execute on a zIIP. The entire contents of this patent publication is hereby incorporated herein by reference. In short, the approach comprises the following operations:

1. Read the object code of the user exit or other routine from disk into memory.
2. Read and process the records constituting the object code as described in the referenced patent publication.
3. When processing the object code's TXT records, identify instructions or sequences of instructions that perform zIIP-ineligible operations. To this end, a prepared table or other data structure that lists the identifying bit patterns of those instructions or instruction sequences may be consulted.
4. Remember each zIIP-ineligible instruction or instruction sequence and its location in the object code.

For example, the instruction codes "4510 xyyy, 0A0A" (in hexadecimal), where the hex digit "x" and the digits "yyy" are both nonzero, identify the system service call "GETMAIN R,LV=(0),LOC=24," which allocates a storage area in memory accessible with 24-bit addresses. This system call is performed using a Supervisor Call (SVC) instruction ("0A0A"), which makes it ineligible for execution on a zIIP. In this example, each comma indicates the boundary between two instructions.

As another example, the instruction codes "1FFF, BFF7 1031, 0DEF" identify the system call "PUT," which submits a data record for output to a sequential file and is also ineligible for execution on a zIIP, even though this instruction sequence itself does not contain an SVC instruction. Instead, it invokes a system routine that may execute an SVC instruction.

There are many system services and other operations that cannot be performed on a zIIP. The instructions or sequences of instructions that identify the invocations of these services or operations, like the bit patterns in the two examples above, can be prepared in a table or other like structure for use in the analysis of the object code.

Depending on the example embodiment, the automatic object code analysis may be performed for the object code of the entire program, or for at least the user exit or other routine. The result of the automatic object code analysis is a list of locations in the code where instruction sequences (including one or more instructions) are performed that are not eligible for execution on a zIIP. This list may be empty, in which the entire routine is eligible for execution on a zIIP. The analysis may also find that the object code is too complex for automatic analysis. In this latter case, the entire routine may be considered not eligible for execution on a zIIP.

Example Techniques for Automatic Classification of a User Exit

Figure 5:
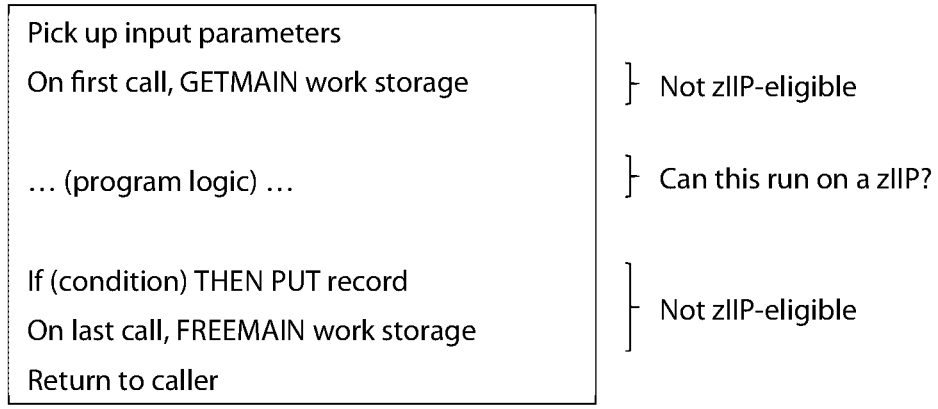
FIG. 5 shows an example user exit or other program that checks provided parameters and conditionally writes a log record.

In certain example embodiments, the analysis of the object code of a user exit or other routine automatically classifies the code into one of the following categories:

- The entire user exit code is eligible for execution on a zIIP. See FIG. 3, which shows an example user exit or other program that calculates a new value from provided input parameters. As will be appreciated, this determination applies to the user exit or other routine as a whole.
- Some parts of the user exit code are not eligible for execution on a zIIP but can be replaced by functionally equivalent code that is eligible. With such replacements, the entire user exit code will be eligible for execution on a zIIP. For example, a system call that is not zIIP-eligible may be replaced by an equivalent call that is zIIP-eligible. See FIG. 4, which shows an example user exit or other program that allocates and release work storage using GETMAIN and FREEMAIN calls. Equivalent calls in this case may be known ahead of time and may represent calls that are performable to use the same input to produce the same output, albeit with the execution being performed via the zIIP rather than the CP. For example, code that must run under a Task Control Block (TCB) may be replaced with code that can run under a Service Request Block (SRB), as the latter can be dispatched on either a CP or a zIIP. As those skilled in the art are aware, based on the z/OS operating system evolved, older system service calls (e.g., from the 1980s or earlier) are not zIIP-eligible, and newer calls (e.g., from the 1990s and later) tend to be zIIP-eligible if possible. GETMAIN/FREEMAIN is a very old (but still supported) system call, whereas STORAGE OBTAIN/RELEASE is more modern and covers all of the functionality of GETMAIN/FREEMAIN and more.
- With or without replacements with functionally equivalent code, some parts of the user exit code are inherently ineligible for execution on a zIIP, but can be modified ("patched") to switch to a CP prior to the execution of zIIP-ineligible operations and, if desired, to switch back to a zIIP afterwards. See FIG. 5, which shows an example user exit or other program that checks provided parameters and conditionally writes a log record.
- The object code of the user exit may be too complex or irregular for a reliable classification into the preceding categories. The entire user exit code thus will be executed on a CP. This operation is described below in connection with the "User Exit Property Table" and the flag "UED eligible." This determination applies to the user exit or other routine as a whole.

In this case, certain example embodiments may attempt to make the possible code replacement(s) for (a) (e.g., to make as much code as possible zIIP-eligible) and to insert code for switching to a CP and back to a zIIP around the code under (b), individually for each piece of zIIP-ineligible code. It will be appreciated that the first and fourth bullet points thus apply to the entire user exit or other routine, whereas the second and third bullet points apply to each zIIP ineligible operation.

Certain example embodiments may provide an administrator or other authorized user the option to manually configure on which type of processor, a CP or zIIP, a user exit or other routine (or portion thereof) should be executed. This may provide a practical expansion to the more automated techniques disclosed herein.

In the first example in the preceding section, the "GET-MAIN R,LV=(0),LOC=24" service call can be replaced by the functionally equivalent service call "STORAGE OBTAIN,LENGTH=(0),LOC=24," which can be invoked from a zIIP.

In the second example in the preceding section, the PUT call cannot be replaced by an equivalent zIIP-eligible service call. The code can be patched, however, so that if a particular execution of a user exit or other routine reaches a PUT call on a zIIP, the execution switches to a CP, invokes the PUT service on the CP, and then decides whether to switch back to a zIIP.

If the classification of a user exit or other routine has found that all of its code can be executed on a zIIP after some zIIP-ineligible parts have been replaced by functionally equivalent code, certain example embodiments will make such replacements and then classify the modified (patched) code as zIIP-eligible in its entirety.

If the classification has found that some zIIP-ineligible parts of the user exit code cannot be replaced by functionally equivalent zIIP-eligible code, certain example embodiments will modify (patch) that code to switch to a CP before performing the zIIP-ineligible operation and then decide whether to switch back to a zIIP or continue executing the user exit code on a CP. This decision can be made at runtime and may be based on previous executions of the patched code—for example, whether the zIIP-ineligible operation was typically followed by further zIIP-ineligible operations within the same execution of the user exit or other routine (e.g., as described below).

The object code for a zIIP-eligible system call may require more space than the object code for the corresponding zIIP-ineligible system call that is to be replaced. Also, if there is no equivalent zIIP-eligible system call, additional code for switching to a CP and back must be inserted. One technique for modifying object code for such purposes works as follows:

The code to be replaced is changed to a branch instruction to a "patch area." If the code to be replaced is longer than that branch instruction, the first part of the replacement code may precede the branch.

At the end of the control section (CSECT) containing the code to be replaced, free space for new code is appended ("patch area"). The replacement code (or its second part) is inserted here, followed by a branch instruction back to the position after the branch to the patch area.

In the first example from above relating to the "GET-MAIN R,LV=(0),LOC=24" service call, "4510 xyyy,0A0A" can be replaced by the following code, which is executable on a zIIP (e.g., as indicated in FIG. 6, which shows object code before and after patching in connection with the GETMAIN example above):

At the position of the code to be replaced: "C0F4 zzzz zzzz," where "z zzz zzz z" specifies the distance, in 2-byte units, from the current position to the patch area appended at the end of the CSECT. The "C0F4" code identifies a branch instruction that performs a "long jump" over the specified distance.

At the corresponding position in the patch area at the end of the CSECT: "41F0 0012, 58E0 0010, 58EE 0304, 58EE 00A0, B218 E000, C0F4 wwww wwww." This is object code for the "STORAGE OBTAIN,LENGTH=(0), LOC=24" system service call, followed by a branch back to the position after the instruction from which this code was entered. "wwww wwww" specifies the negative distance back to the replaced code.

Figure 7:
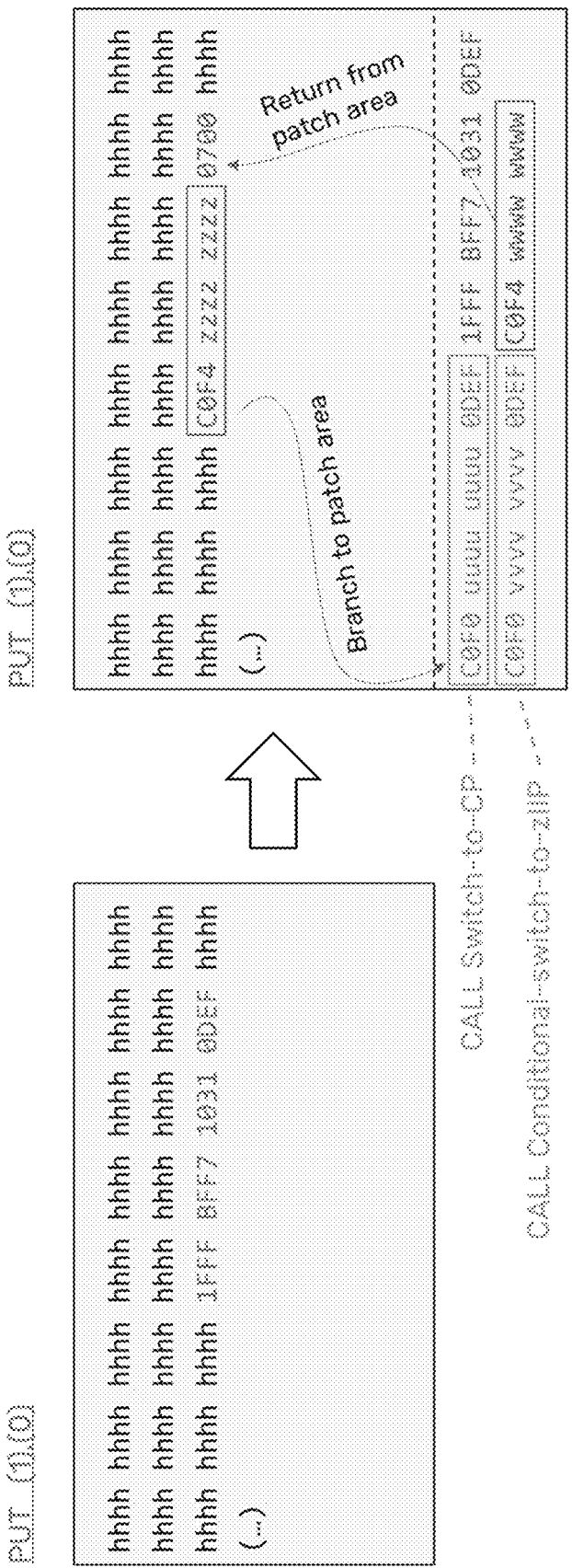
FIG. 7 shows object code before and after patching in connection with a PUT example described herein.

In the second example from above, the object code for the PUT call, "1FFF, BFF7 1031, 0DEF," can be patched as follows to envelop the zIIP-ineligible system call with subroutine calls to switch to a CP and back (e.g., as indicated in FIG. 7, which shows object code before and after patching in connection with the PUT example above):

At the position of the code to be replaced: "C0F4 zzzz zzzz, 0700," where "zzzz zzzz" specifies the distance from the current position to the patch area appended at the end of the CSECT. The "0700" instruction is a filler with no effect ("no operation").

At the corresponding position in the patch area at the end of the CSECT: "C0F0 uuuu uuuu, 0DEF, 1FFF, BFF7 1031, 0DEF, C0F0 vvvv vvvv, 0DEF, C0F4 wwww wwww," where "uuuu uuuu", "vvvv vvvv", and "wwww wwww" specify the distances from the respective instruction to a routine for switching execution to a CP, a routine for conditionally switching execution to a zIIP, and back to the position in the patched code where the PUT call was replaced. The "C0F0" code identifies instructions to load the addresses of the routines for switching to a CP or zIIP, which are provided by the zIIP-enabled program. The original code for the PUT call is sandwiched between invocations of these two routines.

The routine for switching back to a zIIP may include logic to decide under which conditions it is preferable to keep running on a CP. This decision can be made dynamically at runtime, e.g., based on previous experience. For example, if the system service call just completed has typically been the last zIIP-ineligible operation in previous executions of the user exit or other routine, the decision could be to switch back to a zIIP. On the other hand, if the system service call was previously often followed by further zIIP-ineligible operations, it may be more efficient to proceed on the CP. One way to implement this example logic could be to perform the following. For each zIIP-ineligible operation in the user exit or other routine, maintain a static flag indicating whether processing after the operation should proceed on a CP or zIIP. Maintain a reference to the flag associated with the most recent zIIP-ineligible operation executed. At the beginning of the user exit or other routine, reset the reference to NULL. After executing a zIIP-ineligible operation: if the reference points to a flag, set that flag to "proceed on a CP;" set the reference to point to the flag of the operation just executed; and if that flag indicates "proceed on a zIIP," switch to a zIIP. At the end of the user exit or other routine, if the reference points to a flag, set that flag to "proceed on a zIIP."

In certain example embodiments, manual confirmation may be requested and/or required prior to code modification being performed for replacements and/or patches.

Example Techniques for Automatic Code Modification to Retrieve Environmental Information In a multi-user runtime environment, user exit or other routines often contain system calls for retrieving environmental information, which usually are not zIIP-eligible. One such environment is IBM's Online Transaction Processing Management System CICS® (Customer Information Control System), where the "EXEC CICS" system calls must be executed on CPs.

A zIIP-enabled application development framework running programs in CICS can employ the automatic object code analysis, classification, and modification techniques described above to identify such calls and either classify a program as not zIIP-eligible or insert patch code to execute its zIIP-ineligible parts on a CP.

Frequently, system calls are invoked to return environmental information that the application development framework already knows or can determine once for several invocations of a user exit. Such information can include, for example:

Job name (EXEC CICS INQUIRE SYSTEM JOBNAME)
Network identifier (EXEC CICS INQUIRE NETNAME)
System name (EXEC CICS INQUIRE SYSTEM MVS-SYSNAME)
Terminal name (EXEC CICS INQUIRE TERMINAL)
Transaction name (EXEC CICS INQUIRE TRANSACTION)
User identifier (EXEC CICS INQUIRE UOW USERID)

In these cases, the application development framework can provide the requested information in extra parameters for the user exit or other routine and the object code of that routine can be modified to take the information from those parameters, instead of issuing system calls (e.g., as indicated in FIG. 14, which shows original and modified user exit parameter lists for the user exit UEX5A example, discussed in greater detail below). This way, the routine's operation to retrieve the requested information can be executed on a zIIP.

Example Techniques for User Exit Execution on CP and zIIP

Figure 8:
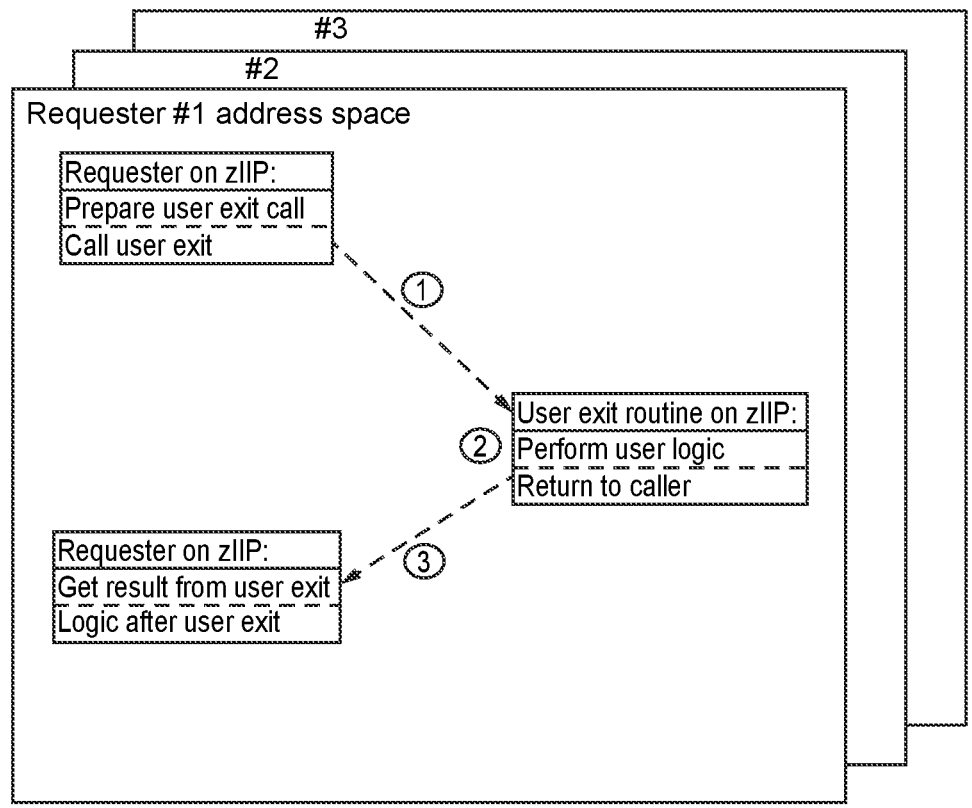
FIG. 8 shows user exit execution on a zIIP.

The example modules for automatic analysis, classification, and modification of the object code of a user exit or other routine described above allow zIIP-enabled programs to call routines not under their control while running on zIIP processors. Any zIIP-enabled caller ("requester") can perform the analysis, classification, and modification steps on its own. If the result is (possibly patched) object code of the routine that is zIIP-eligible, that code can be invoked directly on a zIIP, e.g., as shown in FIG. 8. That is, FIG. 8 shows user exit execution on a zIIP. As shown in FIG. 8, the requester prepares the input parameters and calls the user exit or other routine (1). The user exit or other routine performs its logic (2). The routine then returns control to its caller (3), which accepts the routine's output parameters (if any) and proceeds with its own logic.

If the user exit or other routine cannot be executed entirely on a zIIP, even after replacement of zIIP-ineligible operations by equivalent zIIP-eligible counterparts, then the requester involves a CP in the execution. From the viewpoint of the running program, its control flow is similar to that set forth in FIG. 1a and the description above. That is, the program is run on a zIIP up to a point where zIIP-ineligible code must be executed. A service routine is then called to switch the execution to a CP. The zIIP-ineligible code is run on the CP. A service routine that switches the execution back to a zIIP is called, and the program continues to run on the zIIP.

Figure 1:
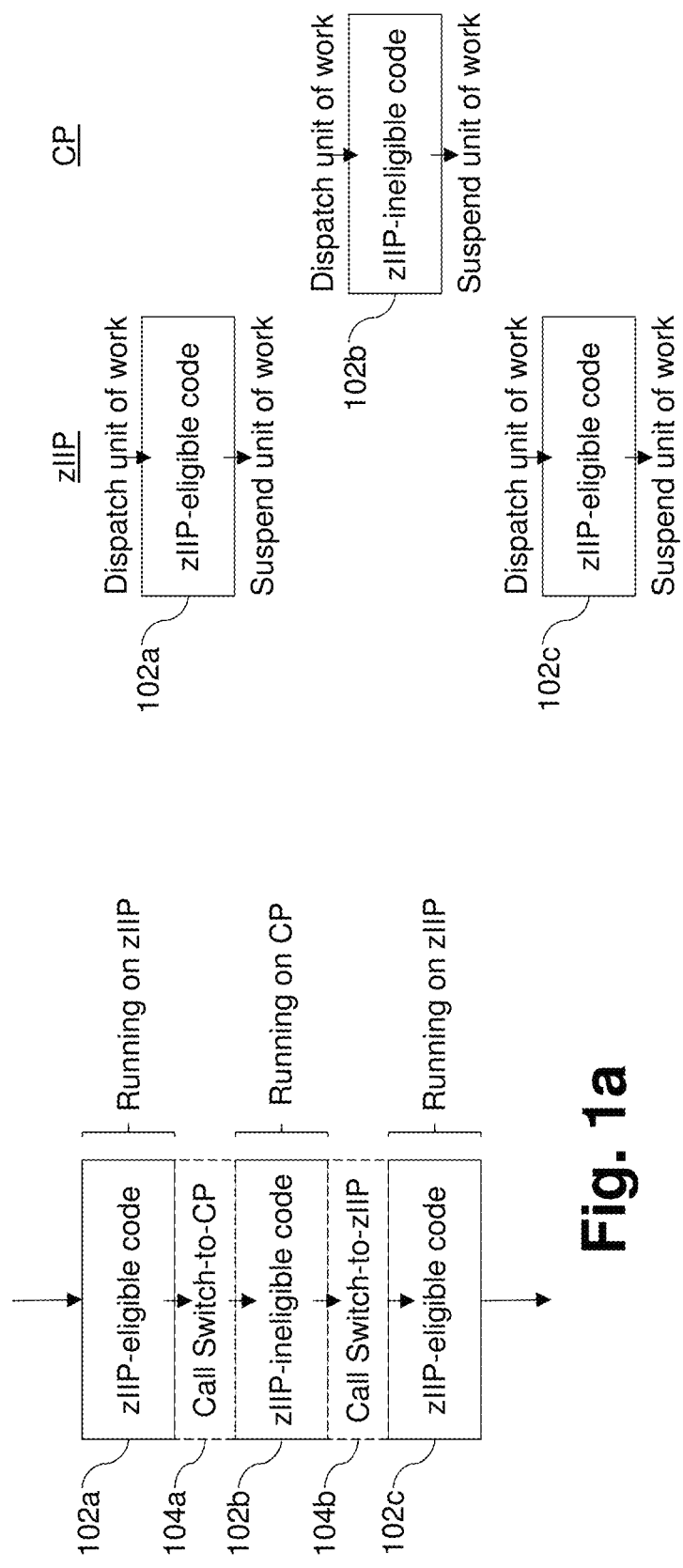
FIG. 1a is a program view of what happens when a program switches from zIIP processing to CP processing and back in accordance with certain conventional techniques.
FIG. 1b is a processor view of the FIG. 1a example.

As will be appreciated from FIG. 1b and the description above, two different processors (or at least two different types of processors) are involved in this control flow, namely, a zIIP and a CP. They have a different perspective on the switching of the execution to a CP and then back to a zIIP. That is, as will be appreciated from FIG. 1b, a zIIP is executing the program. The program reaches a point where it needs to perform a zIIP-ineligible operation and, thus, switches to a CP. The zIIP processing saves its status where its execution must continue and signals a CP to pick up the execution at this point. The zIIP suspends the execution of the program and looks for some other program that is ready to run. If there are no other programs to run, it waits for a signal. A CP reaches a point where it looks for a program that is ready to run. It may already be waiting for a signal or just have finished processing an interrupt. The CP selects the subject program, loads its status, and resumes its execution. The CP then is executing the program.

The process to switch the execution back to a zIIP is symmetrical. The program reaches a point where it can proceed on a zIIP. The CP processing saves its status where its execution must continue and signals a zIIP to pick up the execution at this point. The CP suspends the execution of the program and looks for some other program that is ready to run. If there is none, it waits for a signal. A zIIP reaches a point where it looks for a program that is ready to run. It may be waiting for a signal or just have finished processing an interrupt. The zIIP selects the switching program, loads its status, and resumes its execution. The zIIP then is executing the program.

Thus, where the perspective of a running program is that it just "switches to another processor," the perspective of the processors is that the execution of the program is suspended on one processor and then resumed on another processor. The zIIP-enabled program has two routines, namely, a "zIIP routine" running on a zIIP and a "CP routine" running on a CP, that hand over work items to each other. The CP routine has a "work queue" from which it takes requests to execute certain code on a CP. It puts its results on a separate "result queue" from where the zIIP routine picks up the related control flow.

Figure 9:
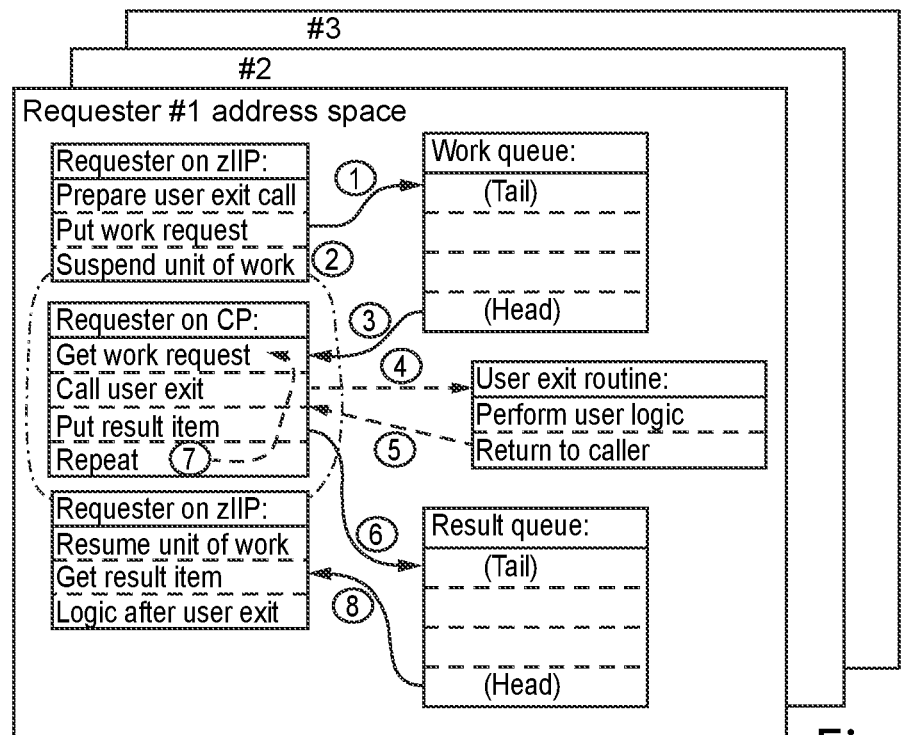
FIG. 9 shows user exit or other routine execution entirely on a CP.

If the result of the upfront analysis, classification, and modification of a user exit or other routine is that the entire user exit or other routine is to be executed on a CP, the requester can follow the approach shown in FIG. 9 to accomplish the same. That is, FIG. 9 shows user exit or other routine execution entirely on a CP. In FIG. 9, the requester, running on a zIIP, prepares the call to the user exit or other routine and puts a request to run that routine on a work queue for its CP routine (1). The requester's zIIP routine suspends this unit of work and does something else (e.g., works on another program's execution) or simply waits (2). The requester's CP routine gets the request from the work queue (3). The CP routine calls the user exit or other routine (4). The routine performs its logic and then returns to its caller (5). The CP routine puts the routine's results on a result queue for the zIIP routine (6). The CP routine has finished its involvement in this execution of the user exit or other routine (7). It cycles back to (3) to process the next request, if any. If it has no more work to do, it waits. The zIIP routine takes the results from its result queue and proceeds with the logic after the call of the user exit or other routine (8).

Figure 10:
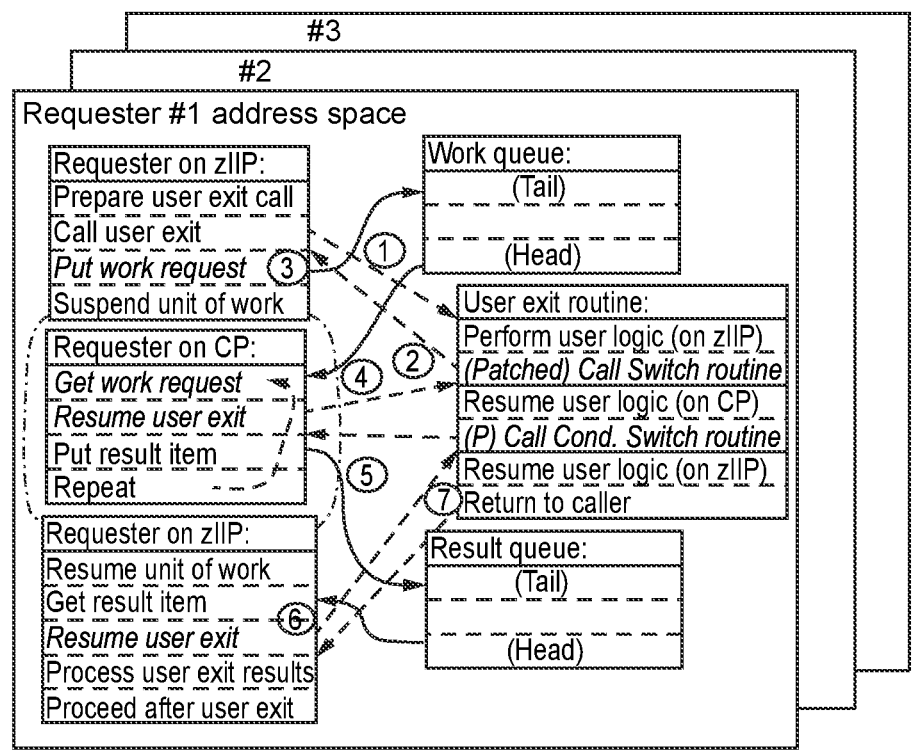
FIG. 10 shows user exit or other routine execution where there is patched code and that begins on a zIIP and continues on a CP.

If the user exit or other routine has been found to be partially zIIP-eligible, it can be patched to call a service routine of the requester to switch to a CP if necessary. In this case the routine can be invoked and start running on a zIIP, e.g., as shown in FIG. 10. That is, FIG. 10 shows user exit or other routine execution where there is patched code and that begins on a zIIP and continues on a CP. As shown in FIG. 10, the requester calls the user exit or other routine directly on a zIIP (1). If the user exit or other routine reaches a point where it performs some zIIP-ineligible operation, it first calls a requester service that gives control back to the requester (2). This call has been inserted into the object code of the routine by the upfront patching step. The requester service saves the current state of the execution of the user exit or other routine and puts a request on a work queue for the CP routine to resume the execution on a CP (3). The CP routine takes the request from its work queue and restores the state of the execution of the user exit or other routine (4), resuming the routine's execution where it left off in (2). After having performed the zIIP-ineligible operation, the user exit or other routine calls a requester service that gives control back to the request (5). This call has also been inserted by the upfront patching step. The requester decides whether to switch back to a zIIP now or continue the execution on the CP. If it decides to switch back to a zIIP, it saves the current state of the execution of the user exit or other routine and puts a result item on the result queue for the zIIP routine to resume the execution on a zIIP. The zIIP routine takes the result item from its result queue and restores the state of the execution of the user exit or other routine (6), resuming the routine's execution where it left off in (5). Eventually, the user exit or other routine returns control to the zIIP routine (7), which processes the provided output parameters and proceeds in its regular line of execution. It is noted that the "request queue" of the CP routine (which takes "requests" to execute a user exit or other routine) is equivalent to the "result queue" of the zIIP routine (which takes the "results" of the user exit or other routine back). In essence, both queues are used of pass on pieces of work to be done to the other (CP or zIIP) routine.

In the description of (5) in preceding paragraph, if the requester service routine decides to continue the execution on the CP, the switch back to the zIIP routine will occur at the latest when the user exit or other routine returns control to its caller. In this case, the status that the CP routine passes to the zIIP routine via the result queue indicates that the user exit or other routine has finished its execution.

In a simpler setup, there may be no work and result queues between the requester's zIIP and CP routines. Rather, each one hands its only work or result item over to the other one and waits for a response (the result item or the next work item), forgoing the option to do other work in parallel while the other routine is running.

If there are multiple independent requesters (e.g., separate zIIP-enabled programs that occasionally need to execute user exits or other routines that have not been not specifically zIIP-enabled), each requester passes its work items for running the user exit routine to its own CP routine. The requesters' CP routines do not share their work in certain example embodiments.

Example User Exit Daemon Related Techniques

Certain example embodiments incorporate a "User Exit Daemon" (UED), which may in some instances be implemented as a separate server. The UED helps execute user exits or other routines on behalf of multiple zIIP-enabled requesters. These could be, for example, different database servers or application development frameworks.

In certain example embodiments, the use of the User Exit Daemon is optional. If it is not used, zIIP-enabled programs perform the execution of user exits and other routines on zIIPs and CPs each on their own.

If a User Exit Daemon is used, a request by a zIIP-enabled requester to invoke a user exit or other routine is processed in the following manner. For the purposes of this illustration, it is assumed that upfront, the object code of the user exit or other routine has been analyzed and classified as explained above, and it has been found that the routine can be executed via the User Exit Daemon. Where necessary, the code has been modified, as described, to either become zIIP-eligible or to switch to a CP to perform zIIP-ineligible operations. This preparation is done only once for a given user exit or other routine. It may be performed dynamically at runtime by the UED, e.g., when the routine is loaded for the first time, has been changed since it was most recently prepared, etc.

If the user exit or other routine has been classified as entirely or partially zIIP-eligible, the requester, running on a zIIP, calls the user exit or routine directly. Otherwise, the requester treats the routine as if it had reached a zIIP-ineligible operation immediately. If/when the user exit or other routine reaches a zIIP-ineligible operation, the modification operation has patched the related code to invoke a requester service for switching to a CP. The requester now invokes a Daemon service to resume the execution of the user exit or other routine on a CP.

The Daemon service will then perform the switch to a CP and pass control back to the routine to invoke the zIIP-ineligible operation. Afterwards, control will again return to the Daemon service to decide on which processor to continue executing the routine, namely, staying on the CP or switching back to a zIIP. The service will perform the necessary operations (e.g., to indicate that processing should continue on the CP, to accomplish the switch, etc., similar to as described above) and resume the execution of the routine. If the user exit or other routine is running on a CP when it finishes and returns control to the Daemon service, the Daemon service will switch back to a zIIP and return control to its requester.

The User Exit Daemon (UED) provides "user exit services" for multiple zIIP-enabled requester programs, each running in its own address space. The UED can execute multiple user exit or other routines for different requesters concurrently on different processors.

Figure 11:
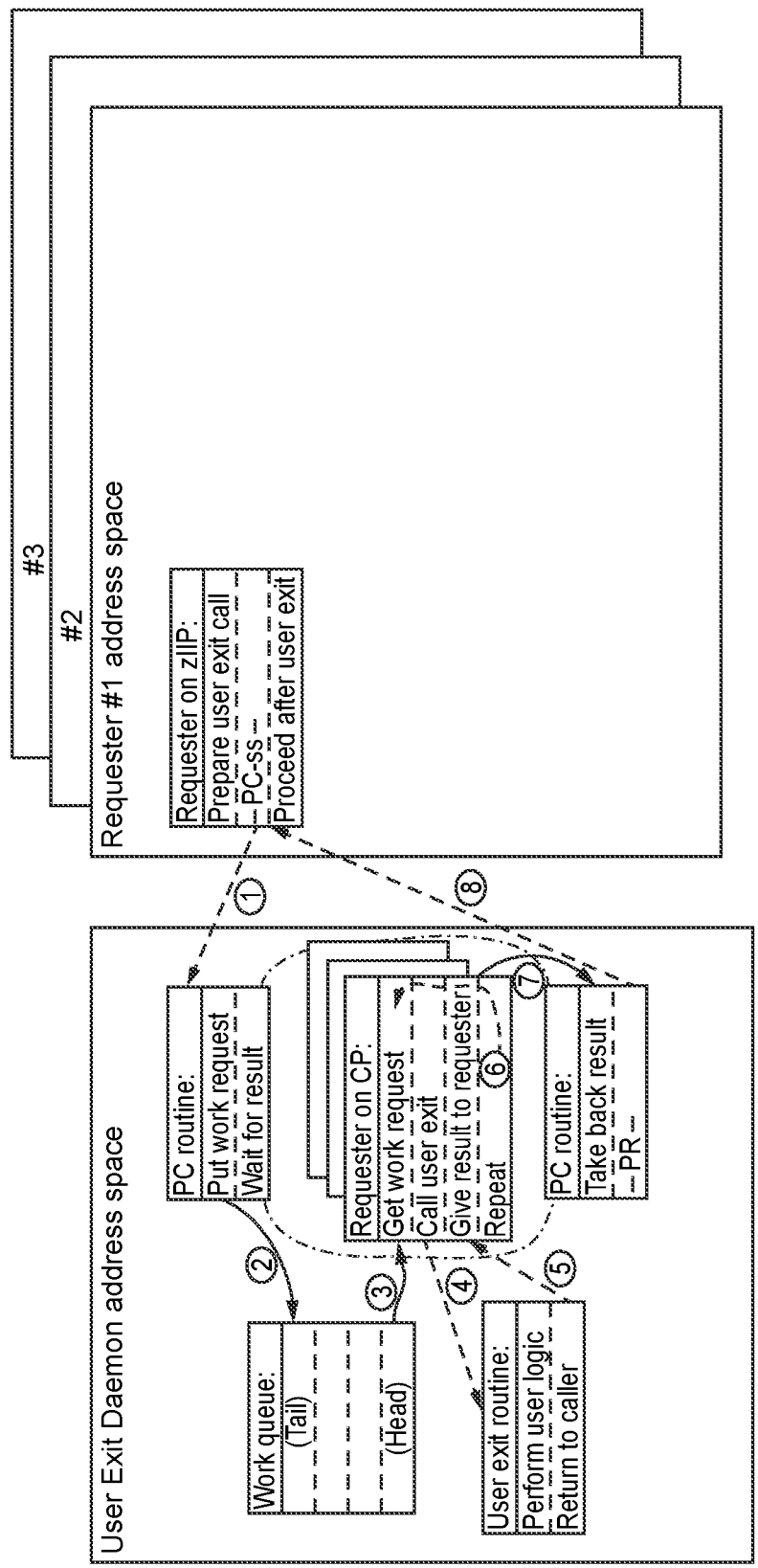
FIG. 11 shows execution of a User Exit Daemon (UED) on a CP only.

If the analysis and classification of a user exit or other routine has determined that the routine should be executed entirely on a CP and that it can be executed in the context (address space) of the UED, this can be accomplished using the procedure shown in FIG. 11. That is, FIG. 11 shows execution of a User Exit Daemon on a CP only. As shown in FIG. 11, the requester, running on a zIIP, prepares the call to the user exit or other routine (1). It then performs a space-switching Program Call (PC-ss) instruction to invoke a PC routine in the address space of the UED. The PC routine puts a request to run the user exit or other routine on a work queue for the UED's CP routines, and it then waits for the result of the request (2). One of the CP routines takes the request from the UED's work queue (3). The user exit or other routine that was initially loaded by the UED is now invoked by the CP routine (4). The user exit or other routine performs its logic and returns control to its caller (5). The CP routine returns the result to the waiting PC routine (6). This involves cycling back to (3) to process the next work request, if any. If it has no more work to do, it simply waits. The PC routine resumes its execution and takes the result passed on by the CP routine (7). The PC routine uses a Program Return (PR) instruction to return control to the requester's zIIP routine in the requester's address space (8). The zIIP routine processes the provided results and proceeds in its regular line of execution.

Figure 12:
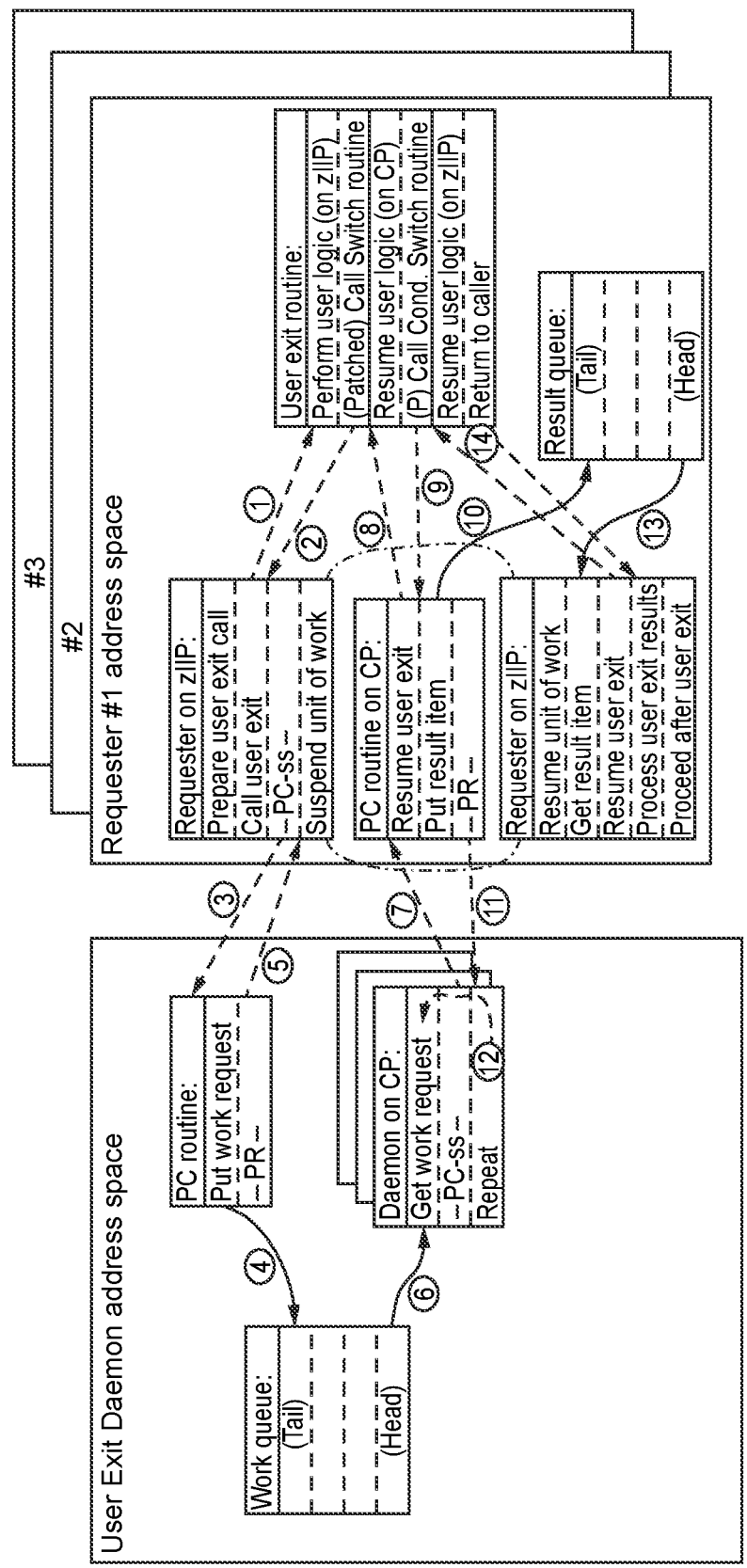
FIG. 12 shows execution of a UED on a zIIP and on a CP.

If the user exit or other routine has been found partially zIIP-eligible, the control flow proceeds as shown in FIG. 12. That is, FIG. 12 shows execution of a UED on a zIIP and on a CP. The FIG. 12 approach shows execution starting on the zIIP and then continuing on the CP, but it will be appreciated that other organizations may apply in different instances and can be handled using the techniques set forth herein. In any event, in the FIG. 12 example, the requester calls the user exit or other routine directly on a zIIP (1). If the routine reaches a point where it performs some zIIP-ineligible operation, it first calls a requester service that gives control back to the requester (2). This call has been inserted into the object code of the routine by the upfront patching operations. The requester service saves the current state of the execution of the user exit or other routine and sets up a request to the UED to resume the execution of the routine on a CP (3). It performs a space-switching Program Call (PC-ss) instruction to invoke a PC routine in the address space of the UED. The UED's PC routine puts the request on a work queue for the CP routine of the UED's, which is to be processed on a CP (4). The PC routine uses a Program Return (PR) instruction to give control back to the requester's zIIP routine in the requester's address space (5). The zIIP routine suspends this unit of work and does something else or waits. Meanwhile, the UED's CP routine takes the request from its work queue (6). The UED's CP routine performs another space-switching PC instruction to invoke a PC routine in the address space of the requester (7). The requester's PC routine restores the state of the execution of the user exit or other routine (8), resuming the routine's execution where it left off in (2). After having performed the zIIP-ineligible operation, the user exit or other routine calls a requester service that gives control back to the request (9). This call has also been inserted by the upfront patching. The service decides whether to switch back to a zIIP now or continue the execution on the CP. If the requester's service routine decides to switch back to a zIIP, it saves the current state of the execution of the user exit or other routine and puts a request item on the result queue for the zIIP routine to resume the execution on a zIIP (10). The requester's PC routine performs a PR instruction to give control back to the UED's CP routine (11). The UED's CP routine has finished its involvement in this execution of the user exit or other routine, and it therefore cycles back to (6) to process the next UED request, if any (12). If it has no more work to do, it waits. The zIIP routine takes the result item from its result queue and restores the state of the execution of the user exit or other routine (13), resuming the routine's execution where it left off in (9). Eventually, the user exit or other routine returns control to the zIIP routine, which processes the provided output parameters and proceeds in its regular line of execution (14).

Example User Exit Property Table

Along with the User Exit Daemon, certain example embodiments provide a persistent data structure for keeping track of user exits and other routines that have been analyzed, classified, and possibly modified as described above. This "User Exit Property Table" may be stored in any suitable transitory or non-transitory computer readable storage location accessible by the computing system such as, for example, a file or database. An example User Exit Property Table is shown in FIG. 13, and it includes several fields for each user exit or other routine. These fields include:

The unique name of the user exit or other routine.

A value ("Version ID") that distinguishes different versions of the routine. This value may be implemented as a hash value (e.g., taken on the routine itself).

Flag "UED eligible" (true/false), indicating whether the routine can be executed by the User Exit Daemon at all. If the code was identified as being too complex to be optimized in any of the above explained manners during the analysis phase, it is to be executed in the default or "conventional" manner. However, it will be appreciated that it is still important to track this result, as a particular user exit can be classified only once.

Flag "Start on zIIP" (true/false), indicating whether the routine can be called on a zIIP or must be called on a CP. If the routine starts execution on a zIIP, it may still switch to a CP later on if it reaches an operation that is not eligible for execution on a zIIP.

Flag "Added Params" (true/false), indicating whether the caller must provide additional parameters with environmental information to the routine. The routine has been modified to take this information from the provided parameters instead of performing zIIP-ineligible operations to determine the related values.

For each additional parameter, the name of an environmental information field that must be provided to the modified routine (e.g., "JOBNAME", "TERMINAL", "USERID"). The analysis and modification operations support a fixed set of environmental inquiries. The table entry defines which field is to be provided in the corresponding extra parameter to the routine.

The User Exit Daemon and its clients (e.g., database servers or application development frameworks) use the User Exit Property Table to communicate with one another about the state of each user exit or other routine that has been analyzed, classified, and possibly modified as described above. In certain example embodiments, only these known routines can be invoked using the UED.

Example Advantages of User Exit Daemon Approach

Involving the User Exit Daemon in the execution of user exits and other routines can offer advantages in the following and/or other scenarios. For example, the UED provides a single point of deployment and maintenance for all user exits and other routines that have not been specifically zIIP-enabled but are to be executed on zIIPs to the extent possible. This in turn offers advantages in the several areas of operation, including the reloading of user exit or other routines, security, and load-time optimization. With respect to reloads of user exit or other routines, if a routine is replaced by a newer version, it has to be unloaded and reloaded only in a single process, namely, the UED. Therefore, it is not necessary to check all running servers that might use the routine and trigger a reload of the newer instance of it. Mainframe security design allows for the specification of a concatenation of datasets from which a module is to be loaded. If additional datasets should be added, or existing datasets should be removed from the search chain, such will be configured only for a single server, namely, the UED, and not for multiple servers that use a user exit or other routine. With respect to load-time optimization, the architectural design also optimizes the number of program loads for a specific user exit or other routine. Thus, when the same routine is invoked by multiple servers, this routine only needs to be loaded once by the UED, instead of multiple times by each server.

Another advantage relates to the fact that the UED may perform the work of analyzing, classifying, and modifying the object code of a user exit or other routine at runtime, when the routine is to be executed for the first time, and keeping the results, including the possible patched object code, for future executions of the routine. The more on-the-fly runtime approach can help avoid the need to analyze, classify, and modify code "offline" before processing is even made possible. This approach also can help save time and/or processing power by avoiding the need to repeatedly perform these steps.

Another advantage is that the UED offers the potential to execute multiple user exits or other routines in parallel on different CPs that the requesting zIIP-enabled server could only execute serially, one after the other. The UED thus can provide faster overall processing, or processing and/or more information is less time.

Still another advantage is that the UED may relieve CPU constraints for multi-user runtime environments that utilize only a single CP for the execution of not specifically zIIP-enabled routines.

In certain example embodiments, one Daemon serving several requesters can reduce the frequency of the CPs executing the user exit or other routines becoming idle. In this case, a CP executing Daemon code may invoke several user exit or other routines in a row, possibly for different requesters, before it must wait for another request. Again, this can improve processing time and/or enable more information to be processed in less time.

Each switch between processors causes extra work for the operating system to manage which program execution a processor is to resume next after is suspended the execution of a processor-switching program. The extra work in turn causes CPU overhead and is not productive for the executed programs. Certain example embodiments have the potential to reduce this overhead, e.g., by reducing the number of switches and more easily persisting less overall information about what to do after suspensions are ended.

In certain example embodiments where a UED is implemented, if multiple requesters issue requests to execute user exit other routines concurrently and these routines typically require switches to a CP, the UED has the chance to let one CP execute multiple stretches of zIIP-ineligible code from different requester requests in a row, without giving control back to the operating system to wait for new requests. When done with one request to execute a user exit or other routine, the UED in certain example embodiments first looks for further work for the CP to do, and tells the operating system that the CP must wait only if there is none. This shortcut of executing multiple user exit or other routines in a row, without waits in-between, reduces the CPU overhead for the processor switches. The more UED requesters issue requests involving the execution of zIIP-ineligible code on CPs, the more CPU overhead for managing the CPs can be saved.

Example UED Exception Handling

The User Exit Daemon in certain example embodiments sets up its own exception handling for the execution of user exits, whether they run on a CP or a zIIP. Exception handlers are activated in the UED for both cases via the standard abnormal end ("abend") handlers of z/OS.

In the case of errors that have been anticipated and can be handled, the zIIP abend handler will trigger a switch to a CP and a retry of the erroneous operation. This is done, for example, for the abend code "SOF8," which indicates an attempt to invoke a zIIP-ineligible system call on a zIIP.

If an error occurs that has not been anticipated and cannot be handled, both exception handlers will report the error and return control to the calling routine in the UED or the requester. This protects both from abnormal termination caused by errors in user exits or other routines that have been incorrectly analyzed and classified, incorrectly modified, or were incorrect in the first place.

Figure 15:
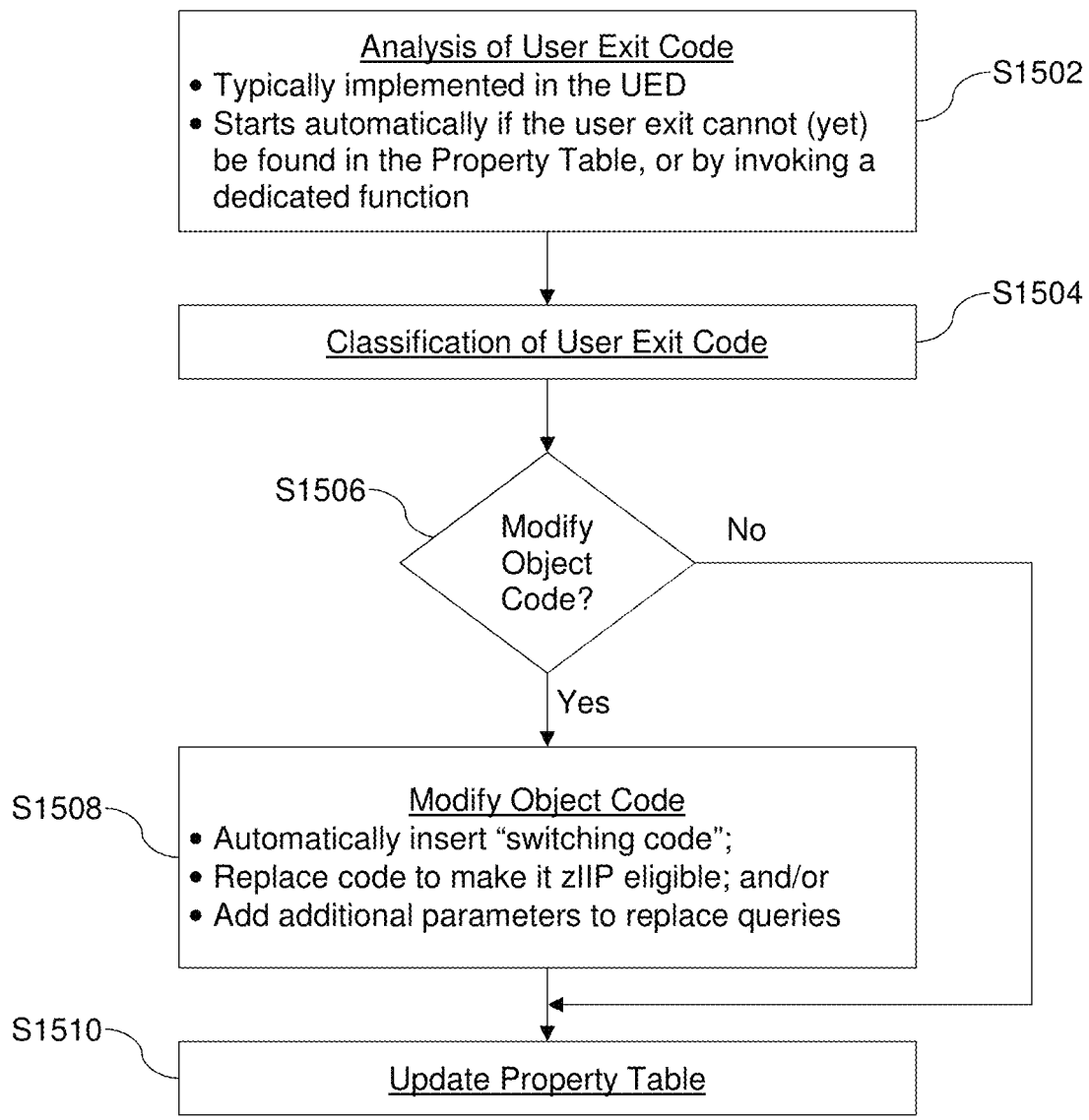
FIG. 15 is a flowchart showing analysis and preparation of user exit or other code in accordance with certain example embodiments.
Figure 16:
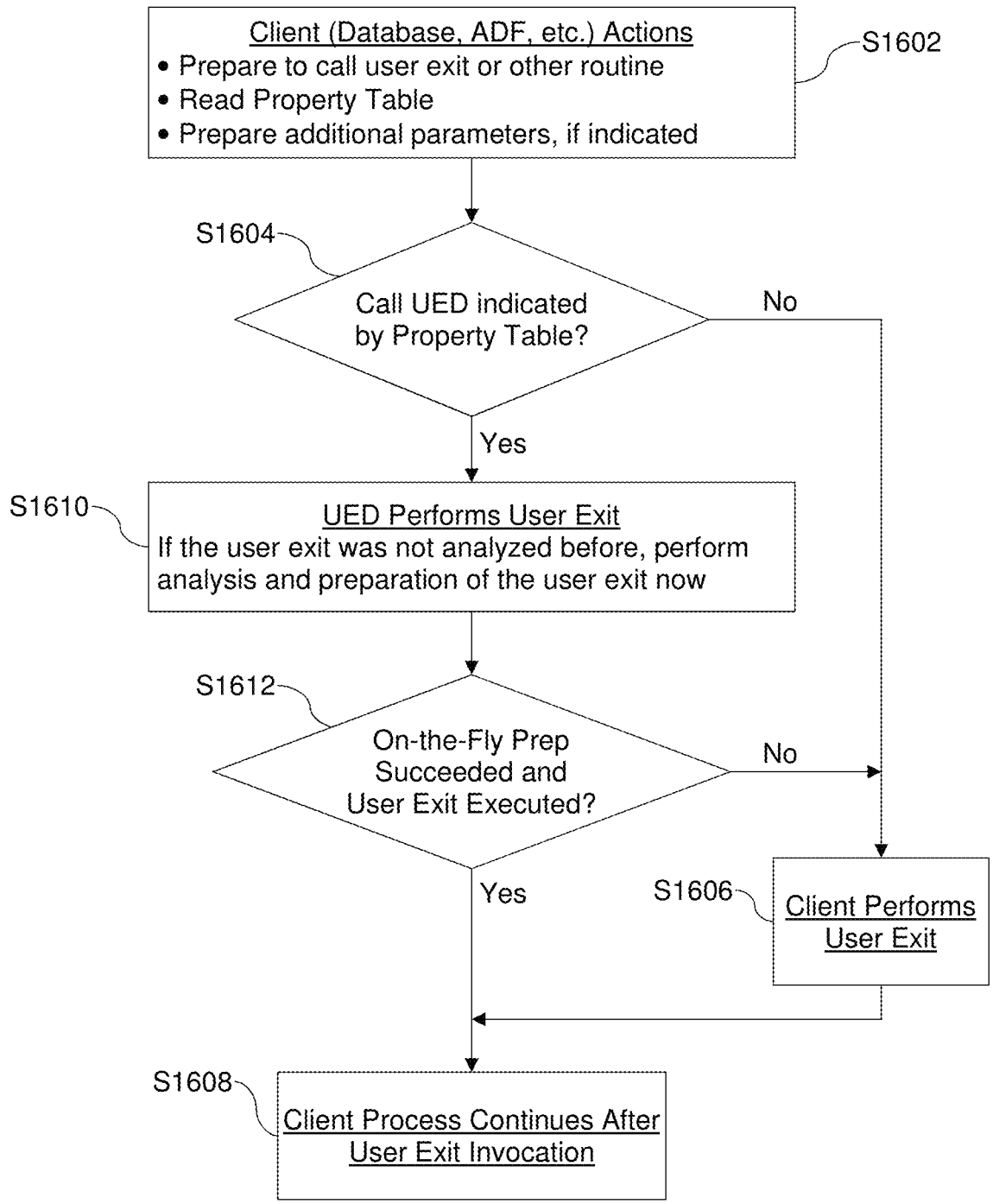
FIG. 16 is a flowchart showing invocation of a user exit or other routine at run in accordance with certain example embodiments.

FIGS. 15-16 are flowcharts providing an end-to-end view of an approach provided in certain example embodiments. More particularly, FIG. 15 is a flowchart showing analysis and preparation of user exit or other code in accordance with certain example embodiments, and FIG. 16 is a flowchart showing invocation of a user exit or other routine at run in accordance with certain example embodiments.

Referring first to FIG. 15, in step S1502, analysis of the user exit code or other routine code is performed. This analysis may be implemented in the UED, which itself may be an application running on a server. The analysis starts automatically if the user exit or other routine is not found in the Property Table, or if a dedicated function is invoked (e.g., by the code itself, by a user wishing to analyze and potentially modify code before or during its execution, etc.). With regard to the potential automatic analysis being triggered if the user exit or other routine is not found in the Property Table, as discussed above, the Property Table may be persisted over time. Thus, its contents may change over time, and a user exit or other routine may not be present in the Property Table unless and until it is encountered, but it may be added over time. Thus, it is possible that an entry for the particular user exit or other routine may not be found in the Property Table at first, but such an entry may be added after initial execution.

In step S1504, the user exit or other routine is classified. In step S1506, a decision is made as to whether to modify the object code in response to the analysis and classification. In response to a decision that the object code should be modified, in step S1508, the object code is modified by automatically inserting "switching code" so that there is a switch from zIIP processing to CP processing, replacing code to make the user exit or other routine performable via the zIIP, and/or adding additional parameters to replace queries or the like. Once the code modification is complete, the Property Table is updated in step S1510. Likewise, in response to a decision that the object code should not be modified having been reached in step S1506, the Property Table is updated in step S1510. That is, if S1508 was executed, the flag "Start on zIIP" in the Property Table will be set to TRUE; otherwise, it will be set to FALSE. The flag UED eligible will be set to FALSE, if the user exit or other routine performs a zIIP ineligible operation that must be performed within the address space of the requester.

As shown in FIG. 16, client actions or requests are received in step S1602. These actions or requests may original with a database, application development framework, or the like. In this situation, the client code prepares to call the user exit or other routine. The Property Table is read to determine if there is an entry, and additional parameters are prepared if there is an indication that they should be based on what is read from the Property Table.

In step S1604, based on the information in the Property Table, a determination is made whether the UED should be called. If a determination is made that the UED should not be called, e.g., if there is no entry found in the Property Table for the particular call being performed by the client, then the client simply performs the user exit or other routine in step S1606, and client the process continues thereafter as indicated in step S1608.

If a determination is made in step S1604 that the UED should be called, then in step S1610 the UED performs the user exit or other routine. If the user exit was not analyzed ahead of time, the analysis and other preparatory operations are performed. As indicated in step S1612, if this on-the-fly preparation is needed but does not succeed, or if the user exit or other routine cannot be executed for some other reason, then the client performs the user exit or other routine in step S1606, and client the process continues thereafter as indicated in step S1608.

As indicated in step S1612, if this on-the-fly preparation is needed and succeeds, or if the on-the-fly preparation is not needed, then the user exit or other routine is executed in the appropriate manner, preferably using the zIIP. The client process continues thereafter, as indicated in step S1608.

Although certain example embodiments have been described in connection with mainframe computing systems, it will be appreciated that the techniques described herein may be used in connection with other computing systems that need not necessarily be considered "mainframes." Such systems generally will include at least one special-purpose processor whose usage is restricted to a subset of operations and that may be purpose-built, as well as at least one general-purpose processor that is able to execute a broader array of operations. Thus, it will be appreciated that although certain example embodiments are described in connection with IBM System z Integrated Information Processors, the techniques of certain example embodiments may be used in connection with different special purpose processors. A system making use of the technology disclosed herein may include one or more general-purpose processors and/or one or more special-purpose processors. Furthermore, the computing systems that may make use of the techniques disclosed herein may have coupled to their processors a system bus, volatile and non-volatile memory, I/O interfaces, and/or the like. Although certain example embodiments refer to "user exits" and a "user exit daemon," the techniques disclosed herein may be used in connection with a variety of different routines that may be problematic when executed on the special-purpose processors. Thus, unless specifically claimed otherwise, the terms "user exit" and "user exit daemon" should be interpreted broadly to include this broad class of potential routines.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computing system, comprising:
a special-purpose processor; and
a general-purpose processor controllable to execute at least some calls that cannot be executed on the special purpose processor;
wherein the computing system is controllable to execute a program thereon, the program comprising a user exit implemented in user exit object code and being callable by a requester running on the special-purpose processor;
wherein the computing system is controllable to perform operations comprising:
automatically classifying the user exit object code as belonging to one of a plurality of possible categories comprising: (a) entirely eligible for execution via the special-purpose processor, (b) eligible for execution via the special-purpose processor provided that each user exit object code portion that is ineligible for execution via the special-purpose processor is replaced with an equivalent special-purpose processor eligible substitute call, (c) patchable to cause a switch from special-purpose processor processing to general purpose-processor processing for each user exit object code portion that inherently cannot be executed via the special-purpose processor, and (d) unclassifiable into one of (a) through (c);
in response to the user exit object code being classified into category (b), attempting to modify the user exit object code to replace each user exit object code portion that is ineligible for execution via the special-purpose processor with an equivalent special-purpose processor eligible substitute call; and
in response to the user exit object code being classified into category (c), attempting to modify the user exit object code to patch the user exit object code to cause system processing to switch from special-purpose processor processing to general-purpose processor processing for each user exit object code portion that inherently cannot be executed via the special-purpose processor;
wherein the requester running on the special-purpose processor is configured to at least call the user exit in response to the user exit being classified into one of categories (a) and (b).

2. The system of claim 1, wherein the computing system is controllable to perform operations further comprising automatically generating a list of locations in the user exit object code where instruction sequences thereof are not eligible for execution via the special-purpose processor.

3. The system of claim 1, wherein the computing system is controllable to perform operations further comprising reclassifying the user exit object code following attempted modification.

4. The system of claim 1, wherein modification attempts are performed dynamically at runtime.

5. The system of claim 1, further comprising a daemon configured to facilitate execution of the program;
wherein the requester running on the special-purpose processor is configured to at least:
call the user exit in response to the user exit being classified into category (a) or (b), and otherwise invoke a daemon service running on the daemon as if a special-purpose processor ineligible call had been reached immediately upon the call of the user exit; and
invoke a daemon service running on the daemon upon reaching a special-purpose processor ineligible call during execution of the user exit; and
wherein the daemon service is configured to at least:
resume execution of the user exit on the general-purpose processor upon invocation of the daemon service; and
following execution of the special-purpose processor ineligible call, determine whether to continue execution of the user exit on the general-purpose processor or to switch back to the special-purpose process for continued execution of the user exit thereon.

6. The system of claim 5, wherein the daemon is configured to perform the classification and to attempt the modifications.

7. The system of claim 5, wherein the daemon is configured to execute multiple user exits for different requesters concurrently on different processors.

8. The system of claim 5, wherein the daemon is configured to execute multiple user exits for different requesters, each running in its own address space.

9. The system of claim 5, wherein in response to the user exit object code being classified into a category indicating that the user exit code is to be executed entirely on the general-purpose processor:
- a program call (PC) routine is invoked in an address space of the daemon by the requester running on the special-purpose processor;
- the PC routine is configured to place on a work queue for the general-purpose processor work requests associated with running the user exit, and to wait for results of the requests;
- for each request placed in the work queue, the general-purpose processor is configured to retrieve and process the respective requests, invoking the user exit in the daemon address space by the general-purpose processor; and
- control is returned to the requester running on the special-purpose processor for further execution of the program when performance of the user exit has completed.

10. The system of claim 5, further comprising a requester address space and a daemon address space, wherein in response to the user exit object code being classified or reclassified into category (c) and the user exit object code being successfully patched:
- the requester, running in the requester address space, is configured to call the user exit on the special-purpose processor; and
- if the user exit running in the requester address reaches a point where it is to perform a special-purpose processor ineligible operation:
  - the user exit is controlled to return control to the requester by virtue of a first call inserted into the user exit object code via the patching;
  - the requester is configured to save a current execution state of the user exit and set up a request to the daemon to resume execution of the user exit on the general-purpose processor;
  - a PC routine is invoked in the daemon address space;
  - the PC routine in the daemon address space is configured to place the request on a work queue for the general-purpose processor running in the daemon address space;
  - the PC routine running in the daemon address space is configured to give control back to the requester in the requester address space;
  - the requester is configured to suspend a unit of work corresponding to the request placed on the work queue;
  - the general-purpose processor running in the daemon address space is configured to retrieve the request from the work queue and invoke a PC routine in the requester address space;
  - the PC routine in the requester address space is configured to restore the current execution state of the user exit and resume execution of the user exit;
  - after execution of special-purpose processor ineligible operation, the user exit is configured to return control to the PC routine in the requester address space by virtue of a second call inserted into the user exit object code via the patching; and
  - a determination is made as to whether to switch back to processing via the special-purpose processor or to continue execution via the general-purpose processor.

11. The system of claim 10, further comprising if the requester makes a determination to switch back to processing via the special-purpose processor:
- the current execution state of the user exit is saved and a result is placed on the result queue for resumption of execution on the special-purpose processor;
- the PC routine in the requester address space is configured to give control back to the general-purpose processor running in the daemon address space; and
- the requester is configured to take the result from the result queue and restore the current execution state of the user exit, resuming execution of the user exit;
- wherein the user exit is configured to return control to the requester to continue execution of the program.

12. The system of claim 11, wherein when the special-purpose processor is running in the daemon address space, further requests placed on the work queue are processible.

13. The system of claim 5, further comprising a memory configured to store a data structure tracking information about user exit routines.

14. The system of claim 13, wherein the data structure includes a unique name of each user exit that has been analyzed and processed.

15. The system of claim 13, wherein the data structure includes information specifying whether a caller of an associated user exit must provide additional parameters.

16. The system of claim 15, wherein the additional parameters include environmental information needed by the associated user exit and are specified in the data structure.

17. The system of claim 1, wherein the special-purpose processor is an IBM System z Integrated Information Processor (zIIP).

18. A method for executing a program on a computing system comprising a special-purpose processor and a general-purpose processor controllable to execute at least some calls that cannot be executed on the special purpose processor, the program comprising a callable routine implemented in callable routine object code and being callable by a requester running on the special-purpose processor, the method comprising:
- automatically classifying the callable routine object code as belonging to one of a plurality of possible categories comprising: (a) entirely eligible for execution via the special-purpose processor, (b) eligible for execution via the special-purpose processor provided that each callable routine object code portion that is ineligible for execution via the special-purpose processor is replaced with an equivalent special-purpose processor eligible substitute call, (c) patchable to cause a switch from special-purpose processor processing to general purpose-processor processing for each callable routine object code portion that inherently cannot be executed via the special-purpose processor, and (d) unclassifiable into one of (a) through (c);
- in response to the callable routine object code being classified into category (b), attempting to modify the callable routine object code to replace each callable routine object code portion that is ineligible for execution via the special-purpose processor with an equivalent special-purpose processor eligible substitute call; and
- in response to the callable routine object code being classified into category (c), attempting to modify the callable routine object code to patch the callable routine object code to cause system processing to switch from special-purpose processor processing to general-purpose processor processing for each callable routine object code portion that inherently cannot be executed via the special-purpose processor;
wherein the requester running on the special-purpose processor is configured to at least call the callable routine in response to the callable routine being classified into one of categories (a) and (b).

19. The method of claim 18, wherein modification attempts are performed dynamically at runtime.

20. The method of claim 18, wherein a daemon is configured to facilitate execution of the program;
wherein the requester running on the special-purpose processor is configured to at least:
call the callable routine in response to the callable routine being classified into category (a) or (b), and otherwise invoke a daemon service running on the daemon as if a special-purpose processor ineligible call had been reached immediately upon the call of the callable routine; and
invoke a daemon service running on the daemon upon reaching a special-purpose processor ineligible call during execution of the callable routine; and
wherein the daemon service is configured to at least:
resume execution of the callable routine on the general-purpose processor upon invocation of the daemon service; and
following execution of the special-purpose processor ineligible call, determine whether to continue execution of the callable routine on the general-purpose processor or to switch back to the special-purpose process for continued execution of the callable routine thereon.

21. The method of claim 20, wherein the daemon is configured to perform the classification and to attempt the modifications.

22. The method of claim 20, wherein in response to the callable routine object code being classified into a category indicating that the callable routine code is to be executed entirely on the general-purpose processor:
a program call (PC) routine is invoked in an address space of the daemon by the requester running on the special-purpose processor;
the PC routine is configured to place on a work queue for the general-purpose processor work requests associated with running the callable routine, and to wait for results of the requests;
for each request placed in the work queue, the general-purpose processor is configured to retrieve and process the respective requests, invoking the callable routine in the daemon address space by the general-purpose processor; and
control is returned to the requester running on the special-purpose processor for further execution of the program when performance of the callable routine has completed.

23. The method of claim 20, wherein in response to the callable routine object code being classified or reclassified into category (c) and the callable routine object code being successfully patched:
the requester, running in a requester address space, is configured to call the callable routine on the special-purpose processor; and
if the callable routine running in the requester address reaches a point where it is to perform a special-purpose processor ineligible operation:
the callable routine is controlled to return control to the requester by virtue of a first call inserted into the callable routine object code via the patching;
the requester is configured to save a current execution state of the callable routine and set up a request to the daemon to resume execution of the callable routine on the general-purpose processor;
a PC routine is invoked in a daemon address space;
the PC routine in the daemon address space is configured to place the request on a work queue for the general-purpose processor running in the daemon address space;
the PC routine running in the daemon address space is configured to give control back to the requester in the requester address space;
the requester is configured to suspend a unit of work corresponding to the request placed on the work queue;
the general-purpose processor running in the daemon address space is configured to retrieve the request from the work queue and invoke a PC routine in the requester address space;
the PC routine in the requester address space is configured to restore the current execution state of the callable routine and resume execution of the callable routine;
after execution of special-purpose processor ineligible operation, the callable routine is configured to return control to the PC routine in the requester address space by virtue of a second call inserted into the callable routine object code via the patching; and
a determination is made as to whether to switch back to processing via the special-purpose processor or to continue execution via the general-purpose processor.

24. The method of claim 23, wherein if the requester makes a determination to switch back to processing via the special-purpose processor:
the current execution state of the callable routine is saved and a result is placed on the result queue for resumption of execution on the special-purpose processor;
the PC routine in the requester address space is configured to give control back to the general-purpose processor running in the daemon address space; and
the requester is configured to take the result from the result queue and restore the current execution state of the callable routine, resuming execution of the callable routine;
wherein the callable routine is configured to return control to the requester to continue execution of the program.

25. The method of claim 20, further comprising tracking information about callable routine routines in a data structure stored in a memory.

26. The method of claim 25, wherein the data structure includes a unique name of each callable routine that has been analyzed and processed.

27. The method of claim 25, wherein the data structure includes information specifying whether a caller of an associated callable routine must provide additional parameters and, if so, the additional parameters include environmental information needed by the associated callable routine and are specified in the data structure.

28. The method of claim 18, wherein the callable routine is code provided by a user of the program, or code invokable by the program that does not originate from the same source as the program.

29. A non-transitory computer readable storage medium tangibly storing instructions that aid in executing a program on a computing system comprising a special-purpose processor and a general-purpose processor controllable to execute at least some calls that cannot be executed on the special purpose processor, the program comprising a callable routine implemented in callable routine object code and being callable by a requester running on the special-purpose processor, the instructions, when executed, performing operations comprising:
 automatically classifying the callable routine object code as belonging to one of a plurality of possible categories comprising: (a) entirely eligible for execution via the special-purpose processor, (b) eligible for execution via the special-purpose processor provided that each callable routine object code portion that is ineligible for execution via the special-purpose processor is replaced with an equivalent special-purpose processor eligible substitute call, (c) patchable to cause a switch from special-purpose processor processing to general purpose-processor processing for each callable routine object code portion that inherently cannot be executed via the special-purpose processor, and (d) unclassifiable into one of (a) through (c);
 in response to the callable routine object code being classified into category (b), attempting to modify the callable routine object code to replace each callable routine object code portion that is ineligible for execution via the special-purpose processor with an equivalent special-purpose processor eligible substitute call; and
 in response to the callable routine object code being classified into category (c), attempting to modify the callable routine object code to patch the callable routine object code to cause system processing to switch from special-purpose processor processing to general-purpose processor processing for each callable routine object code portion that inherently cannot be executed via the special-purpose processor;
 wherein the requester running on the special-purpose processor is configured to at least call the callable routine in response to the callable routine being classified into one of categories (a) and (b).

30. The non-transitory computer readable storage medium of claim 29, wherein a daemon is configured to facilitate execution of the program;
 wherein the requester running on the special-purpose processor is configured to at least:
  call the callable routine in response to the callable routine being classified into category (a) or (b), and otherwise invoke a daemon service running on the daemon as if a special-purpose processor ineligible call had been reached immediately upon the call of the callable routine; and
  invoke a daemon service running on the daemon upon reaching a special-purpose processor ineligible call during execution of the callable routine; and
 wherein the daemon service is configured to at least:
  resume execution of the callable routine on the general-purpose processor upon invocation of the daemon service; and
  following execution of the special-purpose processor ineligible call, determine whether to continue execution of the callable routine on the general-purpose processor or to switch back to the special-purpose process for continued execution of the callable routine thereon.

* * * * *